(12) United States Patent
Toma et al.

(10) Patent No.: US 11,102,547 B2
(45) Date of Patent: *Aug. 24, 2021

(54) TRANSMISSION METHOD, RECEPTION METHOD, TRANSMISSION DEVICE, AND RECEPTION DEVICE

(71) Applicant: Sun Patent Trust, New York, NY (US)

(72) Inventors: Tadamasa Toma, Osaka (JP); Noritaka Iguchi, Osaka (JP); Takahiro Nishi, Nara (JP); Hisaya Katou, Kanagawa (JP)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/423,436

(22) Filed: May 28, 2019

(65) Prior Publication Data

US 2019/0281353 A1    Sep. 12, 2019

Related U.S. Application Data

(63) Continuation of application No. 14/970,750, filed on Dec. 16, 2015, now Pat. No. 10,356,474, which is a
(Continued)

(30) Foreign Application Priority Data

Jul. 15, 2014    (JP) .................................. 2014-145344

(51) Int. Cl.
*H04N 21/43* (2011.01)
*H04N 21/462* (2011.01)
(Continued)

(52) U.S. Cl.
CPC ........ *H04N 21/4622* (2013.01); *H04H 60/13* (2013.01); *H04N 21/4302* (2013.01);
(Continued)

(58) Field of Classification Search
None
See application file for complete search history.

(56) References Cited

U.S. PATENT DOCUMENTS

2005/0166135 A1    7/2005   Burke et al.
2007/0118850 A1    5/2007   Bertin
(Continued)

FOREIGN PATENT DOCUMENTS

EP    2 178 300    4/2010
EP    2 498 494    9/2012
(Continued)

OTHER PUBLICATIONS

Office Action dated Mar. 28, 2018 in corresponding European Patent Application No. 14/30237.5.
(Continued)

*Primary Examiner* — Cai Y Chen
(74) *Attorney, Agent, or Firm* — Wenderoth, Lind & Ponack, L.L.P.

(57) ABSTRACT

According to one aspect of the present disclosure, a transmission method for enabling transmission of content using a broadcast wave and a communication channel includes: transmitting auxiliary information using at least the broadcast wave, the auxiliary information being information for synchronizing content transmission using the broadcast wave and content transmission using the communication channel when the content is transmitted using the broadcast wave and the communication channel, and the auxiliary information causing a reception side to perform the synchronization when the reception side receives the auxiliary information. Therefore, even if timing of starting reception of the content through the communication is delayed, the reception side can play back the content by a combination of the broadcasting and the communication.

10 Claims, 28 Drawing Sheets

```
MPT(){
  table_id
  ...
  MMT PACKAGE ID
  TRANSMISSION CHANNEL IDENTIFICATION DESCRIPTOR number_of_assetsfor(i=0; i<number_of_assets; i++){
    LOCATION INFORMATION ON EACH ASSET
    INDIVIDUAL DESCRIPTOR
  }
}
```

```
TRANSMISSION CHANNEL IDENTIFICATION DESCRIPTOR(){
  ATTRIBUTE INFORMATION
}
```

Related U.S. Application Data continuation of application No. PCT/JP2014/003844, filed on Jul. 22, 2014.

(60) Provisional application No. 61/892,539, filed on Oct. 18, 2013, provisional application No. 61/890,981, filed on Oct. 15, 2013, provisional application No. 61/883,251, filed on Sep. 27, 2013, provisional application No. 61/880,283, filed on Sep. 20, 2013, provisional application No. 61/863,041, filed on Aug. 7, 2013, provisional application No. 61/862,115, filed on Aug. 5, 2013, provisional application No. 61/858,155, filed on Jul. 25, 2013.

(51) Int. Cl.
| | | |
|---|---|---|
| *H04H 60/13* | (2008.01) | |
| *H04N 21/44* | (2011.01) | |
| *H04N 21/488* | (2011.01) | |
| *H04N 21/8543* | (2011.01) | |
| *H04H 20/18* | (2008.01) | |

(52) U.S. Cl.
CPC ... *H04N 21/4307* (2013.01); *H04N 21/44004* (2013.01); *H04N 21/44012* (2013.01); *H04N 21/4888* (2013.01); *H04N 21/8543* (2013.01); *H04H 20/18* (2013.01); *H04H 2201/40* (2013.01)

(56) References Cited

U.S. PATENT DOCUMENTS

| | | |
|---|---|---|
| 2007/0188656 A1 | 8/2007 | Chisaka |
| 2008/0279535 A1* | 11/2008 | Haque ............... H04N 21/2355 386/244 |
| 2011/0164673 A1 | 7/2011 | Shaffer |
| 2013/0293677 A1 | 11/2013 | Lee et al. |
| 2013/0305304 A1 | 11/2013 | Hwang et al. |
| 2014/0090007 A1* | 3/2014 | Okubo ............... H04N 21/4307 725/153 |
| 2014/0237536 A1 | 8/2014 | Jang et al. |
| 2014/0245371 A1 | 8/2014 | Lee et al. |
| 2014/0282798 A1 | 9/2014 | Hwang et al. |
| 2016/0142757 A1 | 5/2016 | Toma et al. |
| 2017/0163945 A1* | 6/2017 | Oh ................... H04L 29/06176 |

FOREIGN PATENT DOCUMENTS

| | | |
|---|---|---|
| EP | 2 611 051 | 7/2013 |
| KR | 2013-0038792 | 4/2013 |
| WO | 2008/084947 | 7/2008 |
| WO | 2008/141341 | 11/2008 |
| WO | 2012/099359 | 7/2012 |
| WO | 2013/042961 | 3/2013 |
| WO | 2013/055164 | 4/2013 |
| WO | 2013/055191 | 4/2013 |
| WO | 2013/061525 | 5/2013 |

OTHER PUBLICATIONS

Official Communication of Summons to attend Oral Proceedings dated Nov. 13, 2018 issued in European Patent Appplication No. 14830237.5.
European Office Action dated Mar. 28, 2018 in corresponding European Patent Application No. 14830237.5.
International Search Report of PCT application No. PCT/JP2014/003844 dated Oct. 28, 2014.
"Information technology—High efficiency coding and media delivery in heterogeneous environments—Par1:MPEG media transport (MMT)" ISO/IEC FDIS 23008-1,2013.
Extended European Search Report dated Jun. 2, 2016 for the related European Patent Application No. 14830237.5.
Office Action dated Mar. 28, 2018 in corresponding European Patent Application No. 14830237.5.
Official Communication of Summons to attend Oral Proceedings dated Nov. 13, 2018 issued in European Patent Application No. 14830237.5.
Preliminary Opinion of the Examining Division about the substantial examination carried out on present application dated Mar. 21, 2019 issued by the Examiner during procedures before Oral Proceedings for the counterpart European Patent Application No. 14 830 237.5.

* cited by examiner

FIG. 1A
```
MPT(){
table_id
...
MMT PACKAGE ID
TRANSMISSION CHANNEL IDENTIFICATION DESCRIPTOR number_of_assetsfor(i=0; i<number_of_assets; i++){
  LOCATION INFORMATION ON EACH ASSET
  INDIVIDUAL DESCRIPTOR
}
}
```

FIG. 1B
```
TRANSMISSION CHANNEL IDENTIFICATION DESCRIPTOR(){
ATTRIBUTE INFORMATION
}
```

FIG. 3A

```
MPT(){
  table_id = 0
  ...
  for(i=0; i<number_of_assets; i++){
    LOCATION INFORMATION ON EACH ASSET TRANSMITTED THROUGH BROADCASTING
      INDIVIDUAL DESCRIPTOR
  }
}
```

FIG. 3B

```
MPT(){
  table_id = 1
  ...
  for(i=0; i<number_of_assets; i++){
    LOCATION INFORMATION ON EACH ASSET TRANSMITTED THROUGH COMMUNICATION
      INDIVIDUAL DESCRIPTOR
  }
}
```

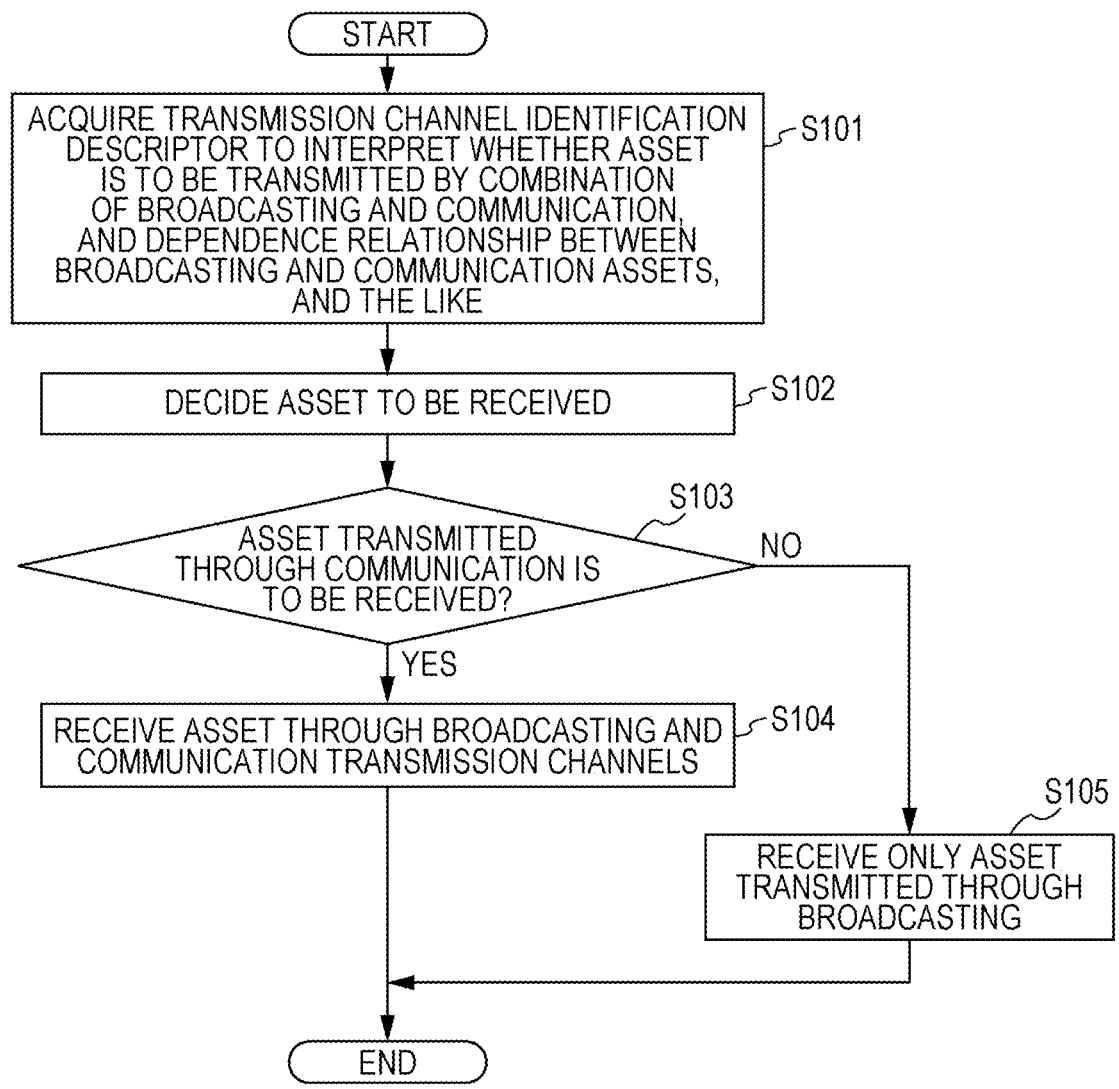

FIG. 6A
```
PMT(){
  ...
  program_number
  ...
  for (i=0; i<N; i++) {
    TRANSMISSION CHANNEL IDENTIFICATION DESCRIPTOR
  }
  for (i=0; i<N1; i++) {
    stream_type
    reserved
    elementary_PID
    reserved
    ES_info_length
    for (i=0; i<N2; i++) {
      descriptor()
    }
    ...
  }
}
```

FIG. 6B
```
TRANSMISSION CHANNEL IDENTIFICATION DESCRIPTOR (){
  ATTRIBUTE INFORMATION
  if(IN COMBINATION WITH COMMUNICATION){
    LOCATION INFORMATION ON COMMUNICATION-SIDE DATA
  }
}
```

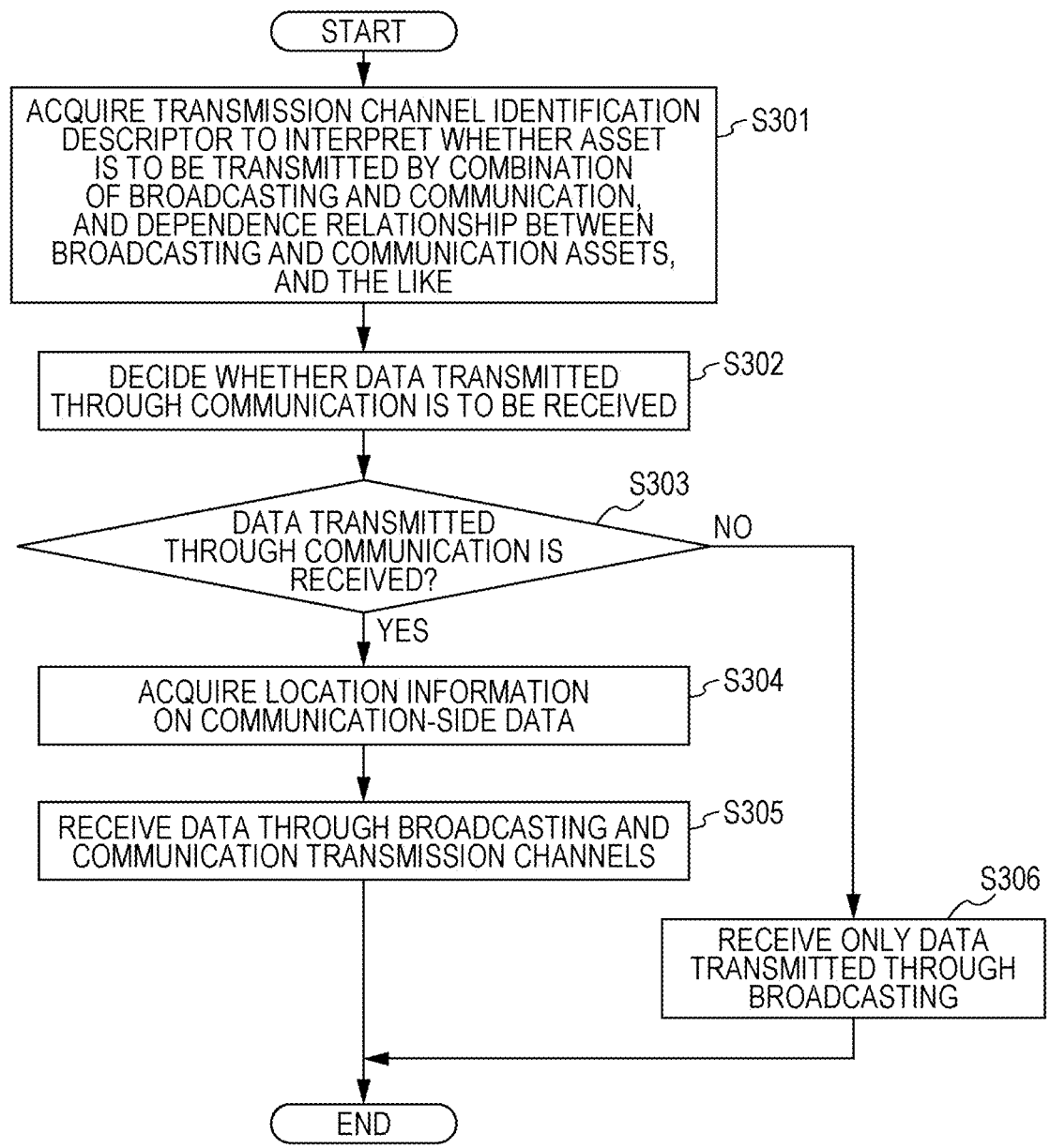

*FIG. 11*

```
LOCATION INFORMATION DESCRIPTOR() {
    TRANSMISSION FORMAT: MPD
    LOCATION: LOCATION OF MPD
    INFORMATION ON SYNCHRONIZATION WITH PCR: SYNCHRONIZATION INFORMATION ON PCR AND NTP
}
```

FIG. 13A
```
LOCATION INFORMATION DESCRIPTOR() {
    data_format;
    location_type;
    if (location_type == 0) {
        PID;
    }
    else {
        url_location;
        if (url_location == 0){
            url_length:
            for (i=0; i < url_length; i++) {
                url_path;
            }
        }
    }
}
```

FIG. 13B
```
LOCATION INFORMATION DESCRIPTOR() {
    location_type;
    if (location_type == 0) {
        data_format;
        PID;
    }
    else {
        url_location;
        if (url_location == 0){
            data_format;
            url_length;
            for (i=0; i < url_length; i++) {
                url_path;
            }
        }
    }
}
```

FIG. 13C

```
LOCATION INFORMATION DESCRIPTOR() {
    url_location;
    if (url_location == 0) {
        data_format;
        location_type;
        if (location_typr == 0){
            PID;
        }
        else {
            url_location;
            for (i=0; i < url_length; i++) {
                url_path;
            }
        }
    }
}
```

FIG. 13D

```
LOCATION INFORMATION DESCRIPTOR() {
    data_format;
    location_type;
    if (location_type == 0) {
        PID;
    }
    else if (location_type == 1){
        url_length;
        for (i=0; i < url_length; i++) {
            url_path;
        }
    }
    else if (location_type == 2){
    }
}
```

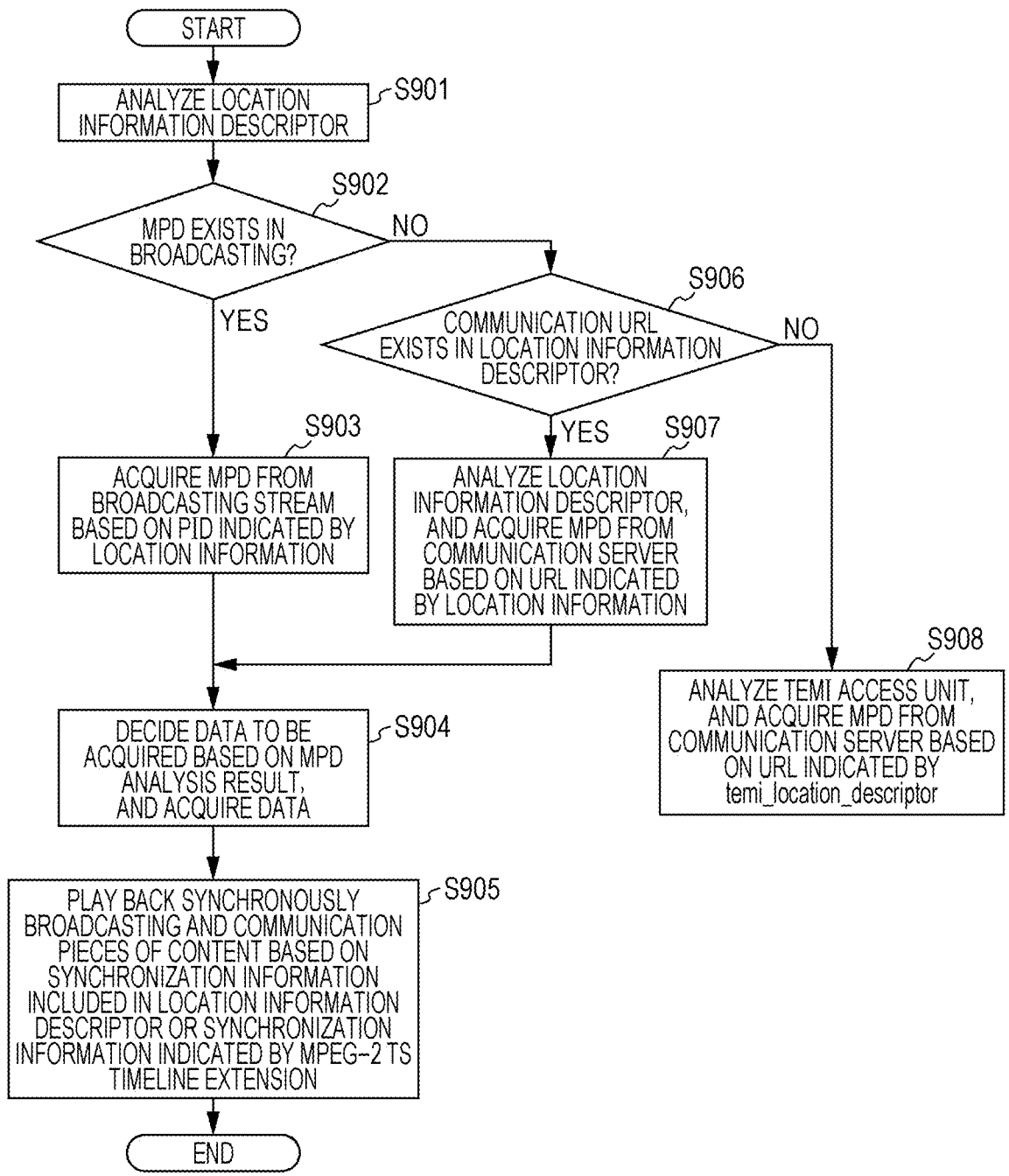

FIG. 18A

```
DEFAULT PLAYBACK CONTROL INFORMATION DESCRIPTOR(){
  · LAYOUT: FULL SCREEN DISPLAY OF VIDEO OF PID=100
}
```

FIG. 18B

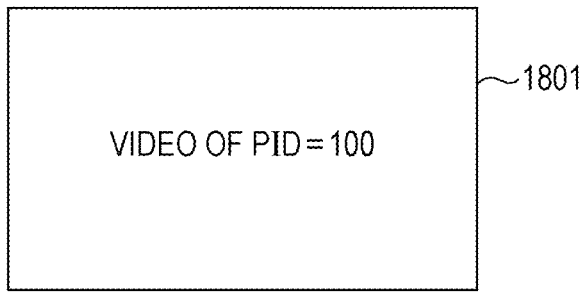

FIG. 19A

```
APPLICATION HTML(){
  <Layout>
    · DESCRIPTION INDICATING AREA 1
    · DESCRIPTION INDICATING AREA 2
  </Layout>
  <Body>
    · DESCRIPTION INDICATING THAT VIDEO OF PID=100 IS TO BE DISPLAYED IN AREA 1
    · DESCRIPTION INDICATING THAT VIDEO OF PID=200 IS TO BE DISPLAYED IN AREA 2
  </Body>
}
```

FIG. 19B

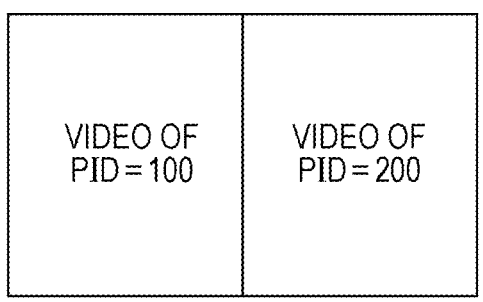

FIG. 20A

```
DEFAULT PLAYBACK CONTROL INFORMATION DESCRIPTOR(){
  · SCALABILITY: TIME SCALABILITY
                VIDEO OF PID=100 IS BASIC LAYER,
                VIDEO OF PID=200 IS EXTENSION LAYER
  · LAYOUT: FULL SCREEN DISPLAY OF VIDEO OF PID=100
}
```

FIG. 20B

ONLY VIDEO OF PID=100 IS DECODED AND DISPLAYED (FRAME RATE IS 60fps) ~1803

FIG. 21A

```
APPLICATION HTML(){
  <Script>
    · DEFINITION OF FUNCTION A
  </Script>
  <Body>
    · DESCRIPTION INDICATING THAT FUNCTION A IS CALLED WHEN BUTTON IS PRESSED
  </Body>
}
```

FIG. 21B

BOTH VIDEO OF PID=100 AND VIDEO OF PID=200 ARE DECODED AND DISPLAYED (FRAME RATE IS 120fps) ~1804

FIG. 24
```
MPT(){
    MMT PACKAGE ID
    PROGRAM CONFIGURATION INFORMATION DESCRIPTOR
    number_of_assets
    for(i = 0; 1 < number_of_assets; i++){
        ASSET ID
        ASSET CONFIGURATION INFORMATION DESCRIPTOR
        number_of_locations
        for(i=0;i<number_of_locations; i++){
            LOCATION INFORMATION DESCRIPTOR
        } //Number_of_locations
    } // Number_of_assets
}
```

FIG. 25
```
PROGRAM CONFIGURATION INFORMATION DESCRIPTOR(){
    ACCUMULATIVE ASSET IS INCLUDED/NOT INCLUDED
    if(ACCUMULATIVE ASSET IS INCLUDED){
        INFORMATION INDICATING PROGRAM CONFIGURATION AND THE LIKE
        INFORMATION ON ACCUMULATIVE ASSET
        TIME INFORMATION RELATIVE TO ACCUMULATIVE ASSET
    }
}
```

FIG. 26
```
LOCATION INFORMATION DESCRIPTOR(){
    LOCATION TYPE
    if(LOCATION TYPE==0x00){
        packet_id
    }else if(LOCATION TYPE==0x01){
        ip_address
    }else if
        ...
    }else if(LOCATION TYPE==0xA0){
        LOCAL ID
    }
}
```

FIG. 27

| Value | Description |
|---|---|
| 0x00 | Same flow |
| 0x01 | A data path in a UDP/IP (version 4) flow |
| ⋮ | ⋮ |
| 0xA0 | Local |

FIG. 28
```
ASSET CONFIGURATION INFORMATION DESCRIPTOR(){
    ACCUMULATIVE PACKET IS INCLUDED/NOT INCLUDED
    if(ACCUMULATIVE PACKET IS INCLUDED){
        INFORMATION INDICATING ASSET CONFIGURATION AND THE LIKE
    }
}
```

TRANSMISSION METHOD, RECEPTION METHOD, TRANSMISSION DEVICE, AND RECEPTION DEVICE

BACKGROUND

1. Technical Field

The present disclosure relates to a data transmission method, a data reception method, a transmission device, and a reception device.

2. Description of the Related Art

Conventionally, a main transmission channel distributing content is a broadcast wave and, for example, there is an MPEG-2 TS (Moving Picture Experts Group-2 Transport Stream) as a media transport system widely used in a current broadcasting system.

On the other hand, with recent progress of a network technology, the content can be distributed through a communication channel such as the Internet. That is, the content can be distributed through not only the broadcast wave but also the communication channel, and the transmission channel through which the content can be distributed is diversified.

For example, NPTL 1 describes MMT (MPEG Media Transport) as a new media transport system in which the content is distributed by a combination of the broadcasting and the communication (see NPTL 1). For example, NPTL 1 discloses a technology of accessing the communication content based on data acquired through the broadcasting mainly used.

CITATION LIST

Non-Patent Literature

NPTL 1: Information technology—High efficiency coding and media delivery in heterogeneous environment—Part 1: MPEG media transport (MMT), ISO/IEC DIS 23008-1

SUMMARY

In one general aspect, the techniques disclosed here feature a transmission method for enabling transmission of content using a broadcast wave and a communication channel, the transmission method includes: transmitting auxiliary information using at least the broadcast wave, the auxiliary information being information for synchronizing content transmission using the broadcast wave and content transmission using the communication channel when the content is transmitted using the broadcast wave and the communication channel, and the auxiliary information causing a reception side to perform the syncronization when the reception side receives the auxiliary information.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium, or any selective combination thereof.

BRIEF DESCRIPTION OF DRAWINGS

FIG. 1A is a view illustrating an example of a data structure of service information in broadcasting and communication cooperation service according to a first exemplary embodiment;

FIG. 1B is a view illustrating an example of the data structure of the service information in the broadcasting and communication cooperation service of the first exemplary embodiment;

FIG. 3A is a view illustrating another example of the data structure of the service information in the broadcasting and communication cooperation service of the first exemplary embodiment;

FIG. 3B is a view illustrating another example of the data structure of the service information in the broadcasting and communication cooperation service of the first exemplary embodiment;

FIG. 4A is a flowchart illustrating an operation example on a reception side in the broadcasting and communication cooperation service of the first exemplary embodiment;

FIG. 6A is a view illustrating an example of a data structure of service information in the broadcasting and communication cooperation service according to a first modification of the first exemplary embodiment;

FIG. 6B is a view illustrating an example of the data structure of the service information in the broadcasting and communication cooperation service of the first modification of the first exemplary embodiment;

FIG. 7B is a flowchart illustrating another operation example on the reception side in the broadcasting and communication cooperation service of the first modification of the first exemplary embodiment;

FIG. 11 is a view illustrating an example of a data structure of service information in the broadcasting and communication cooperation service according to a fourth modification of the first exemplary embodiment;

FIG. 13A is a view illustrating a syntax example of a location information descriptor of the fourth modification of the first exemplary embodiment;

FIG. 13B is a view illustrating a syntax example of the location information descriptor of the fourth modification of the first exemplary embodiment;

FIG. 13C is a view illustrating a syntax example of the location information descriptor of the fourth modification of the first exemplary embodiment;

FIG. 13D is a view illustrating a syntax example of the location information descriptor of the fourth modification of the first exemplary embodiment;

FIG. 14 is a flowchart illustrating an operation example on a reception side in broadcasting and communication cooperation service according to a sixth modification of the first exemplary embodiment;

FIG. 18A is a view illustrating a description example of default playback control information according to a second exemplary embodiment;

FIG. 18B is a view illustrating a video display example according to layout information of the default playback control information in FIG. 18A;

FIG. 19A is a view illustrating an example of application control information of the second exemplary embodiment;

FIG. 19B is a view illustrating a video display example according to the layout information of the application control information in FIG. 19A;

FIG. 20A is a view illustrating another description example of the default playback control information of the second exemplary embodiment;

FIG. 20B is a view illustrating a video display example according to the layout information of the default playback control information in FIG. 20A;

FIG. 21A is a view illustrating an example of the application control information of the second exemplary embodiment;

FIG. 21B is a view illustrating a video display example according to the layout information of the application control information in FIG. 21A;

FIG. 24 is a view illustrating an example of a data structure of service information in broadcasting and communication cooperation service according to a third exemplary embodiment;

FIG. 25 is a view illustrating an example of information included in a program configuration information descriptor of the third exemplary embodiment;

FIG. 26 is a view illustrating an example of information included in a location information descriptor of the third exemplary embodiment;

FIG. 27 is a view illustrating an example of a location type included in the location information descriptor of the third exemplary embodiment;

FIG. 28 is a view illustrating an example of information included in an asset configuration information descriptor of the third exemplary embodiment;

Figure 2:
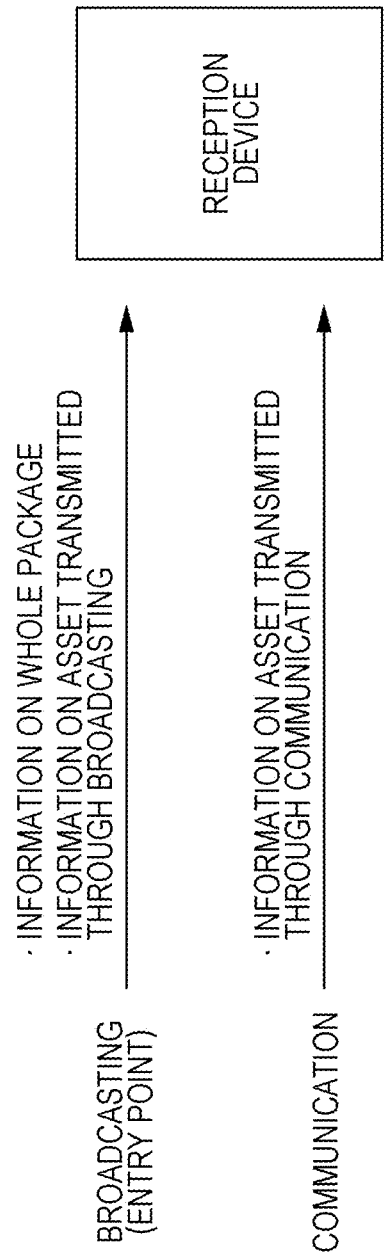
FIG. 2 is a view illustrating an example of an outline of a transmission channel identification descriptor of the first exemplary embodiment.

DESCRIPTION OF EMBODIMENTS (Underlying Knowledge Forming Basis of the Present Disclosure)

Services (broadcasting and communication cooperation service) that distribute the content by the combination of the broadcasting and the communication are currently studied. Among them, the most promising system is one that accesses the content (hereinafter, referred to as communication content) acquired through the communication based on the data acquired through the broadcasting mainly used. As to reception-side operation to receive the content in the broadcasting and communication cooperation service during viewing start, similarly to conventional service that distributes the content only through the broadcasting, it is conceivable that the reception of the content is started by audio or video coded data or an MPEG-2-system data carousel after acquisition of service information.

However, the service information that can be acquired by the conventional service is not compatible with operation to rapidly access the communication content or operation to select and receive only the broadcasting content. Therefore, in the case that the broadcasting and communication cooperation service is performed using the conventional service information, there is a problem in that processing relevant to an analysis of the service information increases or timing of starting the acquisition of the communication content is delayed.

According to one aspect of the present disclosure, a transmission method for enabling transmission of content using a broadcast wave and a communication channel, the transmission method includes an information transmission step of transmitting auxiliary information using at least the broadcast wave, the auxiliary information for synchronizing content transmitted using the broadcast wave and content transmitted using the communication channel when the content is transmitted using the broadcast wave and the communication channel, the auxiliary information causing a reception side to synchronize the content transmitted using the broadcast wave and the content transmitted using the communication channel when the reception side receives the auxiliary information.

The present disclosure can provide the transmission method in which the reception side plays back the content by the combination of the broadcasting and the communication even if the timing of starting the reception of the content through the communication is delayed. More specifically, when the content is transmitted using the broadcast wave and the communication channel, the auxiliary information is transmitted in order to synchronize the content transmitted using the broadcast wave and the content transmitted using the communication channel, so that the reception side can synchronize the content transmitted using the broadcast wave and the content transmitted using the communication channel when receiving the auxiliary information.

In the information transmission step, the auxiliary information may be transmitted in advance of the transmission of the content, and the auxiliary information further may include location information indicating an acquisition destination of the content or information indicating an acquisition destination of the location information.

In the auxiliary information transmission step, the auxiliary information may be transmitted while difference information between a reference clock of the content transmitted using the broadcast wave and a reference clock of the content transmitted using the communication channel is included in the auxiliary information.

In the auxiliary information transmission step, when the reference clocks of the pieces of content differ, the auxiliary information transmission may cause the reception side to achieve the synchronization through synchronization of the reference clock of the content transmitted using the communication channel with the reference clock of the content transmitted using the broadcast wave based on the difference information.

The transmission method may further include a generation step of generating the content in a format compatible with MMT (MPEG Media Transport), and a content transmission step of transmitting the content in the format generated in the generation step.

In the generation step, the content may be generated while the auxiliary information is included in message information that is information on the acquisition of the content.

According to another aspect of the present disclosure, a reception method includes: a reception step of receiving content transmitted using a broadcast wave and content transmitted using a communication channel; and a playback step of playing back the content transmitted using the broadcast wave and the content transmitted using the communication channel while synchronizing the pieces of content, when auxiliary information for synchronizing the content transmitted using the broadcast wave and the content transmitted using the communication channel is received.

In the reception step, the content may be received by acquiring the content based on location information indicating an acquisition destination of the content when the auxiliary information is received in advance of the reception of the content and the auxiliary information includes the location information.

In the reception step, the content may be received by acquiring location information indicating an acquisition destination of the content based on information indicating an acquisition destination of the location information, and acquiring the content based on the acquired location information when the auxiliary information is received in advance of the reception of the content and the auxiliary information includes the information indicating the acquisition destination of the location information.

In the playback step, the content may be played back while the synchronization is achieved through synchronization of the reference clock of the content transmitted using the communication channel with the reference clock of the content transmitted using the broadcast wave based on the difference information when the auxiliary information including difference information between a reference clock of the content transmitted using the broadcast wave and a reference clock of the content transmitted using the communication channel is received in the reception step and the reference clock of the content transmitted using the broadcast wave differs from the reference clock of the content transmitted using the communication channel.

According to still another aspect of the present disclosure, a transmission device that can transmit content using a broadcast wave and a communication channel, the transmission device includes an information transmitter that transmits auxiliary information using at least the broadcast wave, the auxiliary information for synchronizing content transmitted using the broadcast wave and content transmitted using the communication channel when the content is transmitted using the broadcast wave and the communication channel, the auxiliary information causing a reception side to synchronize the content transmitted using the broadcast wave and the content transmitted using the communication channel when the reception side receives the auxiliary information.

According to yet another aspect of the present disclosure, a reception device includes: a reception part that receives content transmitted using a broadcast wave and content transmitted using a communication channel; and a playback part that plays back the content transmitted using the broadcast wave and the content transmitted using the communication channel while synchronizing the pieces of content, when auxiliary information for synchronizing the content transmitted using the broadcast wave and the content transmitted using the communication channel is received.

These overall or specific aspects may be implemented by a transmission method, a transmission device, a reception method, a reception device, an integrated circuit, a computer program, and a recording medium such as a computer-readable CD-ROM, or implemented by any combination of the data reception method, the integrated circuit, the computer program, and the recording medium.

Hereinafter, a transmission method and a reception method according to an exemplary embodiment of the present disclosure will specifically be described with reference to the drawings.

The following exemplary embodiment illustrates a specific example of the present disclosure. The following numerical value, shape, material, component, disposition and connection form of the component, step, and step sequence indicated in the exemplary embodiment are described only by way of example, but do not limit the present disclosure. In the following components of the exemplary embodiment, the component that is not described in an independent claim indicating a highest concept is described as an optional component.

First Exemplary Embodiment

A transmission method for transmitting and receiving content in broadcasting and communication cooperation service will be described in a first exemplary embodiment.

[Transmission Method]

In the first exemplary embodiment, the transmission side transmits the content (data or asset) using the broadcast wave and the communication channel, and transmits the service information in advance of the content transmission.

[Service Information]

As used herein, the service information means a series of information relative to the content reception or meta-data acquisition, such as information used to acquire data relevant to audio or video or data broadcasting after tuning operation (after tuning), or information on EPG (Electric Program Guide).

The current broadcasting is mainly transmitted using an MPEG-2 TS (Transport Stream) section, and includes a PAT (Program Association Table), a PMT (Program Map Table), an NIT (Network Information Table), a CAT (Conditional Access Table), or an EIT (Event Information Table) defined by ARIB (Association of Radio Industries and Businesses).

In the first exemplary embodiment, MMT (MPEG Media Transport) standardized by MPEG will be described as an example of a broadcasting-side multiplexing format in the broadcasting and communication cooperation service. However, the multiplexing format is not limited to the MMT. Alternatively, other multiplexing formats such as TS and MPEG-DASH (Dynamic Adaptive Streaming over HTTP) may be used.

The service information of the first exemplary embodiment is transmitted in a data structure that can be stored in the multiplexing format. For example, in the MMT, the service information is transmitted by a table such as an MPT (MMT Package Table) or message information such as a PA (Package Access) message. In each table, similarly to the TS, auxiliary information can be described using a descriptor.

FIGS. 1A and 1B are views illustrating an example of the data structure of the service information in the broadcasting and communication cooperation service of the first exemplary embodiment. More specifically, FIG. 1A illustrates the MPT including a transmission channel identification descriptor, and FIG. 1B illustrates an example in which information on a transmission channel of an asset constituting, for example, a package is described as attribute information in the transmission channel identification descriptor of FIG. 1A.

(Attribute Information)

1) Information indicating whether the asset constituting the package is to be transmitted by (1) a method in which only the broadcasting is used or (2) a method in which the broadcasting and the communication are combined may be included as the attribute information.

Information indicating whether the audio and video data of a main story is to be transmitted by (1) the method in which only the broadcasting is used or (2) the method in which the broadcasting and the communication are combined may be included as the attribute information. Other pieces of meta-data such as the audio, the video, a still image, and an HTML file, which are different from the main story, can be acquired from a communication network based on the information even if the main story is transmitted only through the broadcasting.

2) Information indicating the relation between the pieces of data transmitted through the broadcasting and communication may be included in the attribute information when the audio or video data is transmitted by the combination of the broadcasting and the communication.

For example, in the case that scalability (time resolution (for example, 60 fps→120 fps), spatial resolution (for example, 4 k→8 k), and bit depth (for example, 8 bits→10 bits)) is provided, the attribute information can indicate that the transmission is performed using a basic layer in the broadcasting, and that the transmission is performed using an extension layer in the communication. The attribute information may indicate that, although a frame rate is 60 fps only for the broadcasting data, the frame rate can be improved up to 120 fps when the communication data is combined. The attribute information may indicate that backup data of the broadcasting is transmitted through the communication. Thus, in the case that a reception status is degraded due to rain attenuation, the transmission side can switch the transmission using the attribute information so as to transmit the data through the communication.

The attribute information may indicate information identifying the assets correlated with each other. For example, the attribute information may indicate an asset ID of the basic layer and an asset ID of the extension layer corresponding to the basic layer.

In the MMT, the identical asset can also be transmitted using a plurality of transmission channels. Accordingly, the attribute information may indicate that the identical asset is to be transmitted by the combination of the broadcasting and the communication. At this point, identification information (such as the asset ID) on the asset may separately be indicated. For example, the information identifying the assets correlated with each other may be indicated by an individual transmission channel identification descriptor of each asset as illustrated in FIG. 2. FIG. 2 is a view illustrating an example of an outline of the transmission channel identification descriptor of the first exemplary embodiment. For example, the individual transmission channel identification descriptor in FIG. 2 may indicate information identifying the asset of the basic layer and the asset of the extension layer, or indicate the asset ID of the corresponding basic layer in the case that the asset is the extension layer.

The attribute information may indicate a list of assets included in a group of the broadcasting assets and a list of assets included in a group of the communication assets. In the case that the asset transmitted by the combination of the broadcasting and the communication exists, the asset may separately be grouped.

3) Information indicating whether the audio or video transmitted through the broadcasting and the audio or video transmitted through the communication are to be synchronously played back may be included as the attribute information.

4) Information indicating whether audio or video clock information transmitted through the broadcasting is identical to audio or video clock information transmitted through the communication may be included as the attribute information.

The attribute information may indicate individual information as an individual field, or information indicating a service type may be defined to identify the individual information by the service type. The attribute information may be described in a format different from that of the descriptor.

The transmission channel identification descriptor may be stored in a table or message indicating information in a package unit different from the MPT. The content of the transmission channel identification descriptor may be described as a data structure different from that of the descriptor.

In the case that the plurality of packages are transmitted, a table or message indicating a list of packages may be defined to indicate such information as the transmission channel identification descriptor being the information in the package unit as the attribute information on the package.

FIGS. 3A and 3B are views illustrating another example of the data structure of the service information in the broadcasting and communication cooperation service of the first exemplary embodiment.

As illustrated in FIGS. 3A and 3B, for the location information on each asset, the asset transmitted through the broadcasting and the asset transmitted through the communication may separately be stored in the MPTs. At this point, the package attribute information can be stored in the MPT transmitted through the transmission channel constituting an entry point of the service. For example, in the case that the broadcasting constitutes the entry point, the attribute information on the package is stored in the MPT transmitted through the broadcasting. The MPT can be identified by table_id.

In the MMT standard, because a value of table_id of the reference MPT is defined as zero, table_id of the MPT corresponding to one of the transmission channels constituting the entry point can be set to zero while table_id of the MPT corresponding to the other transmission channel is set to 1 or more.

The MPT of the broadcasting asset may be transmitted through the broadcasting while the MPT of the communication asset is transmitted through the communication.

The pieces of location information on the broadcasting and communication assets may be stored in one MPT. In this case, the pieces of location information on the broadcasting and communication assets can continuously be stored so as to be easily identified. For example, in the case that N1 broadcasting assets and N2 communication assets exist, after the pieces of information on the N1 broadcasting assets are continuously described, the pieces of information on the N2 communication assets are continuously described. The transmission channel identification descriptor may indicate that the N1 assets are transmitted through the broadcasting while the N2 assets are transmitted through the communication.

Thus, on the transmission side, the service information is transmitted while including the transmission channel identification descriptor of the auxiliary information. Thus, on the reception side, only by acquiring the service information including the auxiliary information, whether the communication data is included or the dependence relationship between the broadcasting data and the communication data can previously be acquired from the package attribute information described in the transmission channel identification descriptor without analyzing the information on each asset.

In particular, a delay time relevant to the start of reception processing can be shortened in receiving the communication data.

[Transmission Device]

For example, the transmission device of the first exemplary embodiment is a content transmission device that can transmit the content using the broadcast wave and the communication channel, and generates the package attribute information such as the transmission channel identification descriptor as the auxiliary information, and transmits the auxiliary information included in the service information.

The transmission device of the first exemplary embodiment may periodically transmit the service information. In updating the content of the service information, the newly-updated content is reflected in the service information immediately after the update.

The entry point is not limited to the broadcasting, but the entry point may be the communication or the entry may be performed through both the broadcasting and the communication. In the case that the entry is performed through both the broadcasting and the communication, the information in the package unit is transmitted from at least the broadcasting and communication transmission devices.

In receiving the content of the broadcasting and communication cooperation service on the reception side, the data transmitted through both the transmission channels is not necessarily received. For example, only the broadcasting data may be received and played back. At this point, because necessity of the information necessary for the reception side to receive the communication data is eliminated during the reception of the broadcasting data, the transmission side may transmit the information necessary for the reception of the communication data using the communication. That is, the transmission side may transmit the information on the package unit through the transmission channel constituting the entry point, and transmit the information unique to the transmission channel such as the broadcasting and the communication through each transmission channel (for example, FIG. 2). In the following description, it is assumed that the broadcasting is the entry point.

Therefore, the service information unique to each transmission channel can be generated and transmitted by the transmission device in each transmission channel. However, information such as the asset location information which is transmitted by the MPT may be transmitted through the broadcasting, since a delay time relevant to the communication-side asset acquisition start can be decreased by collectively acquiring such information.

(Example of Information Unique to Communication)

An example of the information unique to the communication (a communication network such as the Internet and a CDN (Content Delivery Network)) will be described below.

1) Information, such as an FEC (Forward Error Correction) system and a parameter, which relates to the FEC in the packet transmitted through the communication 2) Information, such as a packet loss ratio, jitter at a packet arrival clock time, an RTT (Round Trip Time), and an end-to-end delay in the communication transmission channel, which relates to QoS (Quality of Service) control 3) Information, such as a buffering time and a buffering amount, which relates to buffering until the decoding is started since the asset data is received Even in the broadcasting, particularly in mobile broadcasting (for example, one-segment broadcasting in Japan), the FEC and the QoS are important, and the parameters in the FEC and the QoS are different from those of the communication channel. Therefore, the information unique to the broadcasting may be transmitted only through the broadcasting.

On the other hand, in the communication, the plurality of pieces of audio or video data such as the bit rate and the frame rate can be selected according to a band of the communication network. At this point, information correlating the attribute information (such as the bit rate) and the asset ID of the selectable data with each other may be transmitted. The correlating information may be transmitted through the broadcasting.

Information indicating whether the plurality of selectable assets exist may be indicated as the correlating information, or a list of selectable assets may be indicated as the correlating information in the case that the plurality of selectable assets exist.

[Reception Method]

In the first exemplary embodiment, the reception side starts the reception (acquisition) of the content after acquiring the service information. A reception method of the first exemplary embodiment will be described below with reference to the drawings.

FIG. 4A is a flowchart illustrating an operation example on the reception side in the broadcasting and communication cooperation service of the first exemplary embodiment. FIG. 4A illustrates an example of the operation in which the reception device acquires the transmission channel identification descriptor of the first exemplary embodiment to decide the asset to be received.

For example, the PA message or MPT table included in the MPT message is acquired as the service information transmitted through the transmission channel constituting the entry point, and the transmission channel identification descriptor included in the PA message or MPT table is acquired.

Information on the transmission channel identification descriptor information is interpreted regarding, for example, whether the asset is to be transmitted by the combination of the broadcasting and the communication and, if both of the transmission channels are to be used, an independence relationship between the broadcasting and communication assets (Step S101).

The message such as the PA message is stored in a payload of the packet such as the MMT packet, and a type of storage data is indicated by a packet header. Accordingly, in receiving the MMT package, the MMT packet of the PA message is acquired by referring to an ID number (corresponding to packet_id in the MMT packet) at the packet header.

The asset to be received is decided based on a playback capability of a terminal or availability of the communication channel (Step S102).

An example of the asset decision method will be described below.

1) In the case that the reception device is not connected to the communication network, it is determined that only the asset is received through the broadcasting. At this point the asset transmitted by the combination of the broadcasting and the communication is not received.

2) When the video basic layer is transmitted through the broadcasting while the video extension layer is transmitted through the communication, it is decided that the video basic layer is to be received through the broadcasting in the case that only the video basic layer can be played back, and it is decided that the video basic layer is to be received through the broadcasting while the video extension layer is to be received through the communication in the case that both the video basic layer and the video extension layer can be played back. For example, it is assumed that the time scalability of 60 fps is implemented only by the basic layer, and that the time scalability of 120 fps is implemented by the basic layer and the extension layer. At this point, the data is received only through the broadcasting when the reception device can decode and display the data only up to 60 fps, and the pieces of data are received through both the broadcasting and the communication when the reception device can decode and display the data up to 120 fps.

3) According to the band of the communication network to which the reception device is connected, the receivable asset is decided from the plurality of assets having different bit rates at which the transmission is performed through the communication. At this point, it is assumed that information such as the bit rate of each asset is separately transmitted in the service information. In the case that the stably receivable asset does not exist due to poor reception conditions caused by congestion of the communication network, it may be decided that the communication-side data is not to be received.

4) In the case that the backup data is transmitted through the communication in preparation for degradation of a broadcasting reception environment, the asset to be acquired may be decided when the broadcasting reception environment degrades. In this case, the reception device may monitor the broadcasting reception environment, determine whether the communication asset is to be received based on an index such as an error rate in the reception data, and perform the reception processing.

5) When the data (such as the data in the video extension layer) that is played back in synchronization with the audio or video data of the main story transmitted through the broadcasting is received through the communication, sometimes such special operation that the data is buffered before the playback start is required in order to assure the synchronization between the data received through the broadcasting and the data received through the communication. In such cases, only the asset that is not required to be strictly synchronized (for example, the synchronization in frame unit) with the data received through the broadcasting may be received through the communication. For example, it may be decided that the assets of HTML data, a still image, and a video image in which the strict synchronization is not required are acquired through the communication.

The description is made referring to the flowchart in FIG. 4A.

In Step S103, whether the asset transmitted through the communication is to be received is decided (determined). The flow goes to S104 when the decision (determination) that the asset is to be received is made (YES in S103), and the flow goes to S105 when the decision (determination) that the asset is not to be received is made (NO in S103).

In S104, the asset is received through both the broadcasting and communication transmission channels. In S105, the asset is received only through the broadcasting.

Figure 4B:
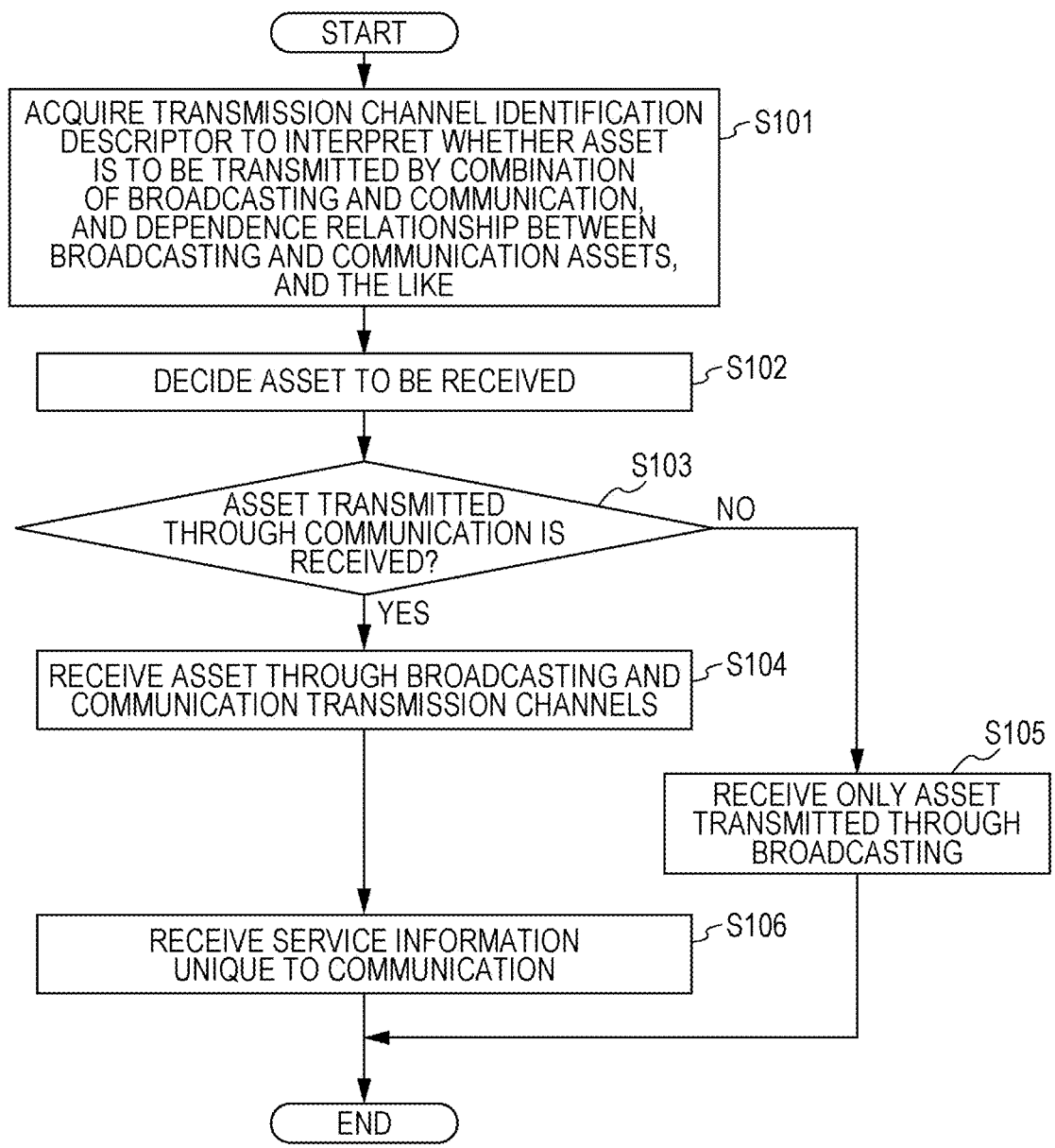
FIG. 4B is a flowchart illustrating another operation example on the reception side in the broadcasting and communication cooperation service of the first exemplary embodiment.

FIG. 4B is a flowchart illustrating another operation example on the reception side in the broadcasting and communication cooperation service of the first exemplary embodiment.

In FIG. 4B, compared with FIG. 4A, a step of receiving the service information unique to the communication (Step S106) is added in the case that the service information is transmitted through the communication. Because other steps are similar to those in FIG. 4A, the description is omitted.

It is assumed that in the case that the service information unique to the broadcasting exists, such information is separately received in another step (not illustrated).

Only the broadcasting asset is to be received in the case that the reception device is not compatible with the broadcasting and communication cooperation service. In this case, the asset transmitted by the combination of the broadcasting and the communication is not received.

[Reception Device]

Figure 5:
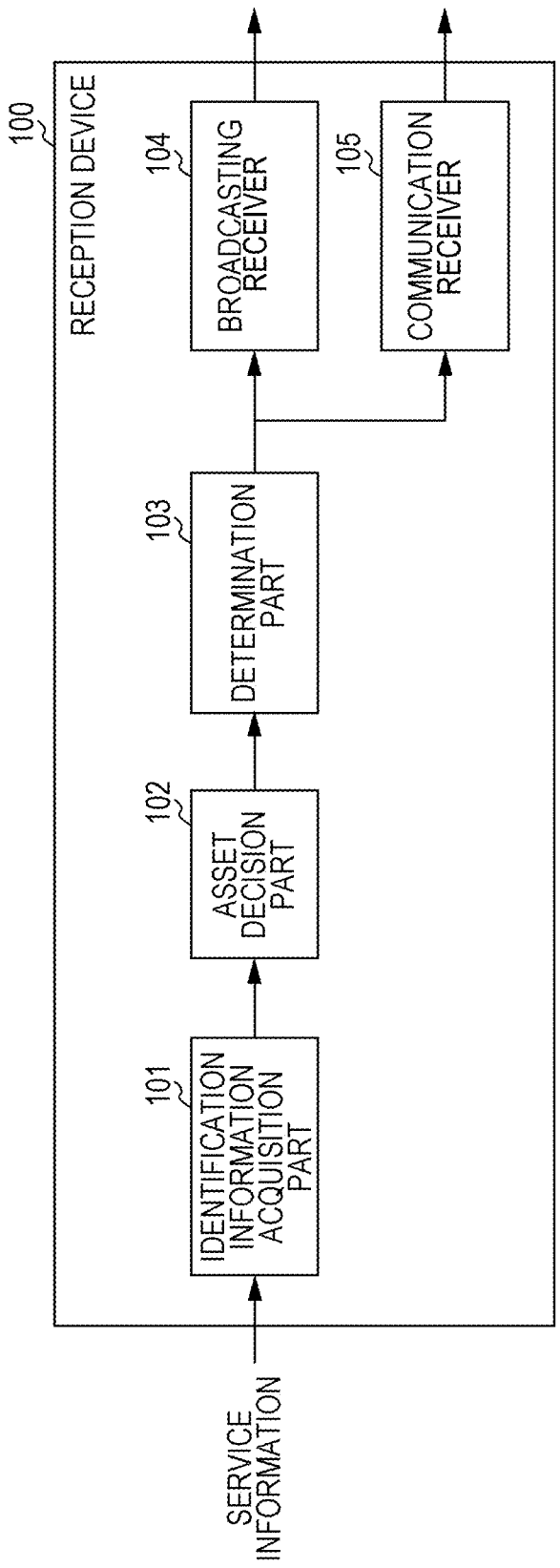
FIG. 5 is a block diagram illustrating a configuration example of a reception device of the first exemplary embodiment.

FIG. 5 is a block diagram illustrating a configuration example of a reception device of the first exemplary embodiment. FIG. 5 illustrates the configuration example of the reception device that performs the reception method in FIG. 4A.

Reception device 100 in FIG. 5 includes identification information acquisition part 101, asset decision part 102, determination part 103, broadcasting receiver 104, and communication receiver 105.

Identification information acquisition part 101 has a function of performing Step S101 in FIG. 4A. Specifically, identification information acquisition part 101 acquires the service information transmitted through the transmission channel constituting the entry point, and acquires the transmission channel identification descriptor (auxiliary information) included in the service information. Identification information acquisition part 11 interprets the information on the transmission channel identification descriptor.

Asset decision part 102 has a function of performing Step S102 in FIG. 4A, and decides the asset to be received based on the playback capability of the terminal or the availability of the communication channel.

Determination part 103 has a function of performing Step S103 in FIG. 4A, and decides (determines) whether the asset transmitted through the communication is to be received. Specifically, determination part 103 determines whether the communication data is to be received. When the communication data is to be received, broadcasting receiver 104 and communication receiver 105 receive the data of the asset decided in Step 102.

When determination part 103 determines that the communication data is not to be received, the data is received using only broadcasting receiver 104.

(First Modification)

An example of the case that the data is transmitted through the broadcasting using the TS while the data is transmitted through the communication using DASH or RTP (Real-time Transport Protocol) will be described in a first modification.

FIGS. 6A and 6B are views illustrating an example of the data structure of the service information in the broadcasting and communication cooperation service of the first modification of the first exemplary embodiment. FIG. 6A illustrates an example in which the information on the data transmitted through the communication is stored in the PMT. FIG. 6B illustrates a data structure example of the transmission channel identification descriptor of the first modification.

In first modification, the transmission channel identification descriptor indicating the attribute information in FIGS. 1A and 1B is stored in the PMT that is of an example of the service information.

Only the location information on the data transmitted by the TS is indicated in the program information in the TS such as the PMT. Therefore, in first modification, the location information on the communication-side data is stored in the transmission channel identification descriptor when the content data is transmitted in combination with the communication. More specifically, the attribute information includes flag information indicating whether the communication is to be also used. Thus, the transmission side can perform the selection whether to include location information on the communication-side data according to a value of the flag information. The location information is not necessarily stored in the transmission channel identification descriptor. A descriptor may separately be defined so as to store the location information therein.

(Location Information)

The location information means information indicating the acquisition destination of the data. The PID corresponds to the location information for the TS, and the URL or URI corresponds to the location information for the communication.

MPD (Media Presentation Description) of the DASH or SDP (Session Description Protocol) of the RTP may be stored as the location information.

Not only the data entity of the MPD or SDP location information, but also information indicating the acquisition destination of the data entity of the location information may be stored in the location information. For example, the information indicating the acquisition destination of the data entity of the location information is information indicating the URL for acquiring the MPD. However, if the information indicating the acquisition destination of the data entity of the location information is stored in the location information, a delay is generated because the data entity of the location information is separately acquired. Therefore, desirably the data entity is directly stored in the location information from the viewpoint of reducing the delay until the communication-side data reception start.

The MPD of the DASH has a large size because various pieces of information on the acquisition destination of the content are included in the MPD of the DASH. Accordingly, instead of directly storing the MPD in the location information, subset information only including the URL of the acquisition destination of the content and information on a DTS (Decoding Time Stamp) or a PTS (Presentation Time Stamp) of the segment may be stored.

Desirably the update of the content of the location information such as the MPD can be dealt with.

For example, a version number may be provided to the location information. Thus, the location information can be acquired again when the version number is updated. The information such as the transmission channel identification descriptor in the periodically-transmitted PMT may sequentially be checked in order to confirm whether the version number is updated. Alternatively, since the sequential checking processing is heavy, section data to store the location information and the like may separately be generated (hereinafter, referred to as a transmission channel identification section), and periodically be transmitted.

In the reception device, whether the location information is updated can be determined when the version number is confirmed in the transmission channel identification section. The attribute information or the location information may be transmitted in both the program information such as the PMT and the transmission channel identification section. Alternatively, only the location information may be stored in the transmission channel identification section.

After the acquisition of the communication-side data is started based on the location information acquired from the broadcasting, the update content of the location information may be acquired through the communication. At this point, because the acquisition destination of the location information is required, the acquisition destination of the location information may be stored in the broadcasting transmission channel identification descriptor together with the data entity of the location information.

In the reception device, the update content can be acquired through the communication by accessing the acquisition destination of the location information at fixed intervals.

In the case that a message exchange mechanism exists between a distribution server of the DASH content and the reception device, the distribution server may issue a message notifying that the location information is updated to the reception device. In the reception device, the location information may be acquired again when the message is received.

In first modification, the information on the data transmitted through the communication is stored in the PMT. Alternatively, the attribute information or the location information may be transmitted by a section different from the PMT.

The communication-side data acquisition method may be changed based on whether the data transmitted through the communication is to be played back in synchronization with the audio or video of the broadcasting.

For example, in the case that the synchronization playback is performed, the communication-side data can be accessed from the program information on the broadcasting as described above. In the case that the synchronization playback is not performed, information for accessing the communication-side data may be transmitted by data broadcasting using an AIT (Application Information Table)

defined by a hybridcast specification in ARIB (Association of Radio Industries and Businesses). In the reception device, the AIT is received in the format of the table, carousel, or the like, and the communication-side data is acquired based on the content of the AIT. The playback of the acquired communication-side data is started when an event message transmitted by the data broadcasting is received.

The information such as the AIT may be used even in the case that the broadcasting data and the communication data are to be synchronously played back. At this point, it is assumed that the clock time the playback of the communication-side data is to be started or ended is separately indicated in the data broadcasting. In the reception device, the communication-side data is played back according to these clock times.

In the MPD of the DASH or the SDP of the RTP, the content playback start clock time or the content decoding start clock time can be indicated, and these clock times are specified based on the reference clock, such as UTC (Coordinated Universal Time), which is defined in each multiplexing or transmission system. The PTS (Presentation Time Stamp) or DTS (Decoding Time Stamp) of an individual video frame or audio sample are also set based on the reference clock. On the other hand, in the broadcasting, because a PCR (Program Clock Reference) serves as the reference clock, information indicating a correlation between the reference clocks of the broadcasting-side data and communication-side data is required when the broadcasting-side data and the communication-side data are to be synchronously played back.

Accordingly, the information indicating the correlation between the reference clocks of the broadcasting-side data and communication-side data may be included in the program information, such as the PMT, on the broadcasting. For example, the information indicating the correlation between the reference clocks of the broadcasting-side data and communication-side data may be information indicating that the clock time at which the value of the broadcasting PCR is N1 is identical to the clock time at which the value of the communication UTC is N2. These pieces of information may be included in the MPD or SDP.

Transport layer protocol information indicating whether the communication-side data is to be transmitted by a UDP (User Datagram Protocol) or a TCP (Transmission Control Protocol) may be indicated in the transmission channel identification descriptor. Thus, the reception device can open a port to be used in each protocol or determine whether the reception device is compatible with the protocol to be used.

For example, whether the multiplexing format is compatible with the DASH or RTP may be identified by indicating the identification information on the multiplexing format of the communication-side data.

[Reception Method]

An operation example of the reception device in the case that the data is received through the broadcasting using the TS while the data is received through the communication using the DASH or RTP (Real-time Transport Protocol) will be described as the reception method of first modification with reference to the drawings.

Figure 7A:
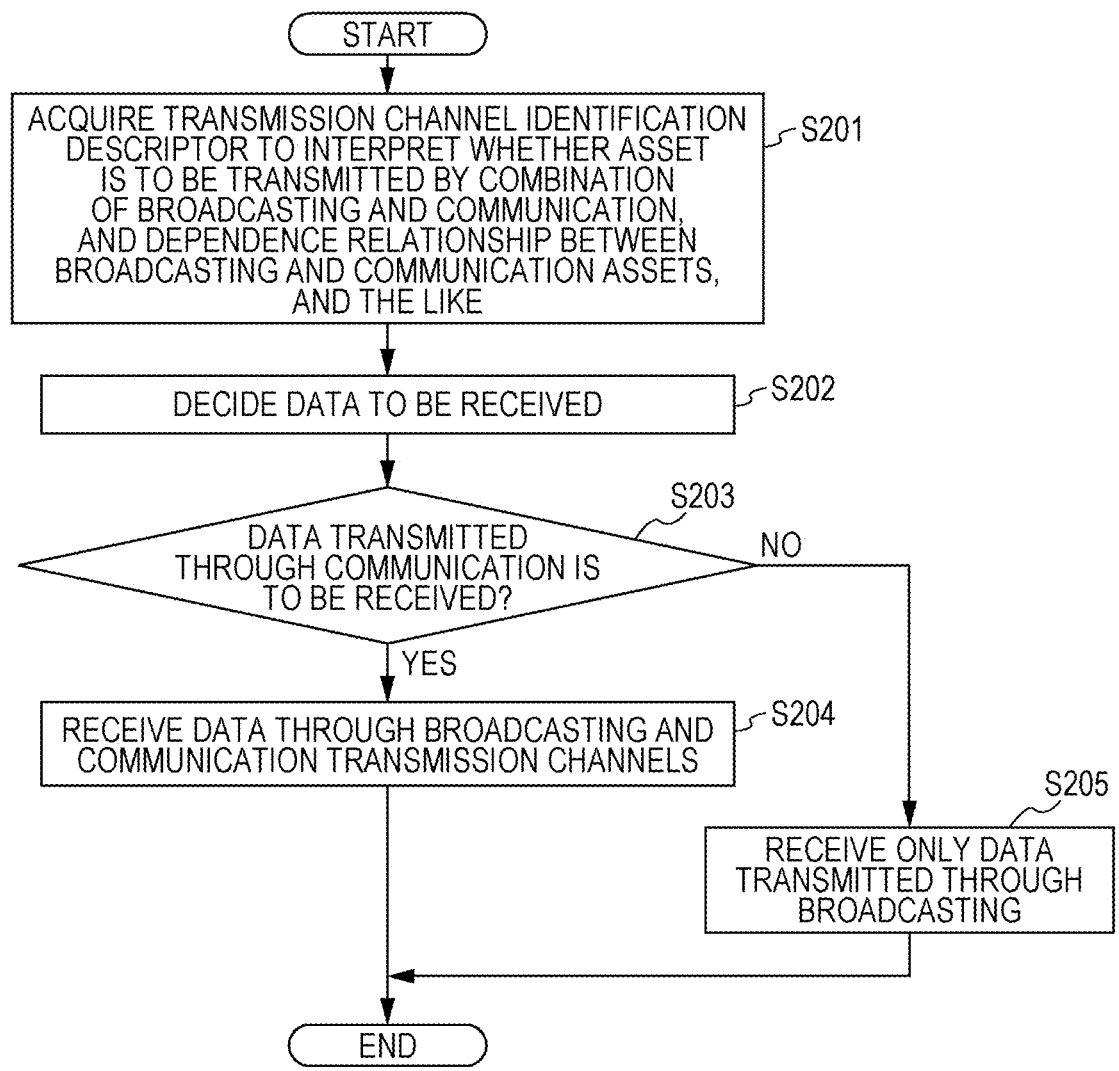
FIG. 7A is a flowchart illustrating an operation example on a reception side in the broadcasting and communication cooperation service of the first modification of the first exemplary embodiment.

FIG. 7A is a flowchart illustrating an operation example on the reception side in the broadcasting and communication cooperation service of the first modification of the first exemplary embodiment. FIG. 7A illustrates an operation example of the reception device when the attribute information or the location information is stored in the program information on the broadcasting.

The operation in each step (Steps S201 to S205) is similar to that of the flowchart in FIG. 4A. However, although the broadcasting-side data and the communication-side data are unified by the asset of the MMT package as illustrated in FIG. 4A, the data is received through the broadcasting using the TS while the data is received through the communication using the DASH or RTP as illustrated in FIG. 7A. Because other points are similar to those in FIG. 4A, the detailed description is omitted.

FIG. 7B is a flowchart illustrating another operation example on the reception side in the broadcasting and communication cooperation service of the first modification of the first exemplary embodiment. FIG. 7B illustrates an example of the operation in which the attribute information and the access information for acquiring the location information are stored in the program information of the broadcasting while the entity of the location information is not stored.

Because Step S301 is similar to Step S201, the description is omitted.

In Step S302, whether the communication-side data is to be received is decided (determined). The flow goes from S303 to S304 when the communication-side data is to be received, and the flow goes from S303 to S306 when the communication-side data is not to be received.

In Step S304, the location information is acquired according to the acquisition destination of the location information on the communication-side data included in the program information on the broadcasting.

On the other hand, in Step S305, the communication-side data is acquired based on the location information acquired in S304, and the broadcasting data is acquired. In S306, only the data transmitted through the broadcasting is acquired.

(Attribute Information)

The attribute information is similar to that of the first exemplary embodiment. Since the MMT is described by way of example in the first exemplary embodiment, an example of the case that the data is received through the broadcasting using the TS while the data is received through the communication using the DASH or RTP will be described below.

1) Information indicating whether the audio and video data constituting the content is to be transmitted by (1) the method in which only the broadcasting is used or (2) the method in which the broadcasting and the communication are combined may be included as the attribute information.

Information indicating whether the audio and video data is to be transmitted by (1) the method in which only the broadcasting is used or (2) the method in which the broadcasting and the communication are combined may be included as the attribute information. Other pieces of metadata such as the audio, the video, the still image, and the HTML file can be acquired from the communication network separately from the main story based on the information even if the main story is transmitted only through the broadcasting.

2) Information indicating the relation between the pieces of data transmitted through the broadcasting and communication may be included in the attribute information when the audio or video is transmitted by the combination of the broadcasting and the communication.

For example, in the case that scalability (time resolution (for example, 60 fps→120 fps), spatial resolution (for example, 4 k→8 k), and bit depth (for example, 8 bits→10 bits)) is provided, the attribute information can indicate that the transmission is performed using the basic layer in the broadcasting, and that the transmission is performed using the extension layer in the communication. The attribute information may indicate that, although a frame rate is 60 fps only for the broadcasting data as a use case, the frame rate can be improved up to 120 fps when the communication data is combined. The attribute information may indicate that backup data of the broadcasting is transmitted through the communication. Thus, in the case that a reception status is degraded due to rain attenuation, the transmission side can switch the transmission using the attribute information so as to transmit the data through the communication.

The attribute information may indicate information identifying the coded streams correlated with each other. For example, the attribute information can indicate the PID of the TS packet in which the data of the basic layer transmitted through the broadcasting is stored, and the segment in the DASH data transmitted through the communication, or the identification information on the video data such as the track ID in the MP4.

The attribute information may indicate information indicating the broadcasting-side data and communication-side data, which are to be synchronously played back. Thus, the transmission side can transmit video images of a plurality of viewpoints or video images of a main screen and a sub-screen in picture-in-picture through the broadcasting and the communication, respectively.

3) Information indicating whether the audio or video transmitted through the broadcasting and the audio or video transmitted through the communication are to be synchronously played back may be included as the attribute information.

4) Information indicating whether audio or video clock information transmitted through the broadcasting is identical to audio or video clock information transmitted through the communication may be included as the attribute information.

5) Information indicating that whether the communication-side data is live content may be included in the attribute information.

For example, unless the transmitted content is the live content, the data after current clock time (T1) can be acquired. Accordingly, the broadcasting-side data can be played back without delay by starting the data reception from data which can be played back at clock time (T2) obtained by adding a time until the reception start since a content acquisition request (or an estimated value of the time) and a summation (ΔT) of a data buffering time to the current clock time. At this point, the communication-side data is played back from clock time T2. On the other hand, in the case that the transmitted content is live content, the broadcasting-side data is buffered for ΔT, the playback of both the broadcasting data and the communication data may be started at clock time T2.

In the case that the communication side multicasts or broadcasts the content by the RTP, the data after the current clock time cannot be acquired irrespective of whether the content is the live content. Accordingly, information indicating whether the communication-side data is multicast or broadcast may be included in the attribute information.

[Reception Device]

A configuration example of the reception device in the case that the data is received through the broadcasting using the TS while the data is received through the communication using the DASH or RTP (Real-time Transport Protocol) will be described below.

Figure 8:
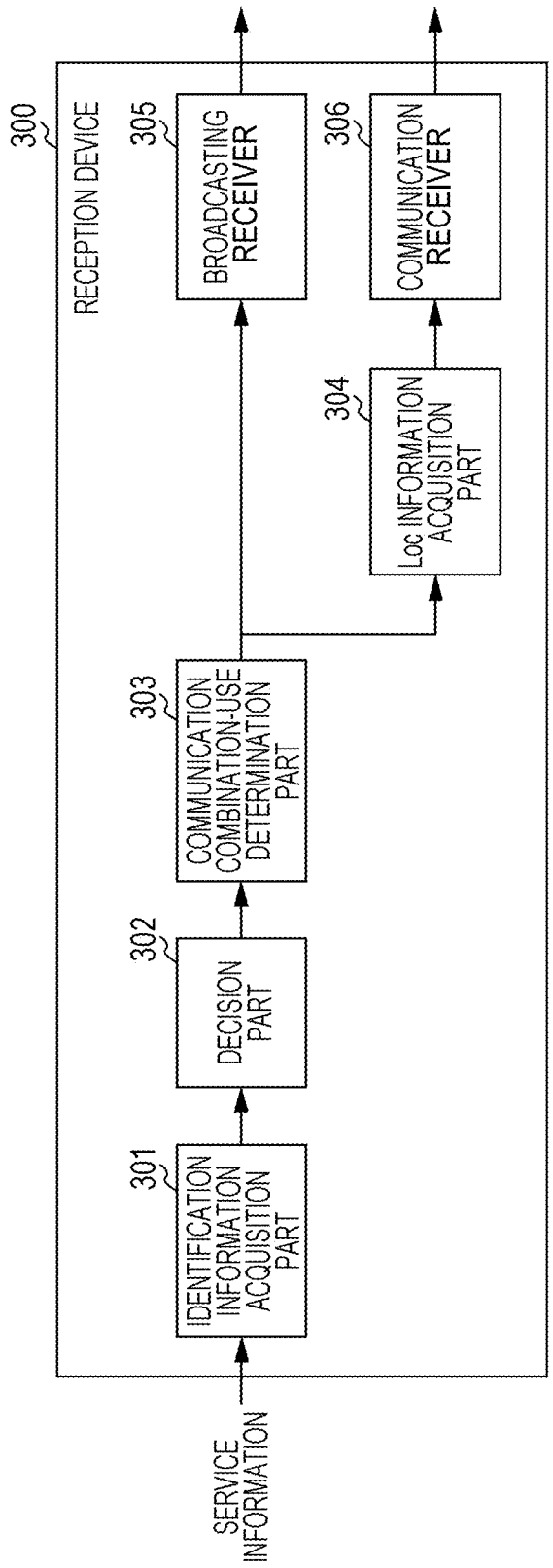
FIG. 8 is a block diagram illustrating a configuration example of a reception device of the first modification of the first exemplary embodiment.

FIG. 8 is a block diagram illustrating a configuration example of the reception device of the first modification of the first exemplary embodiment. FIG. 8 illustrates the configuration example of the reception device that performs the reception method in FIG. 7B.

Reception device 300 in FIG. 8 includes identification information acquisition part 301, decision part 302, communication combination-use determination part 303, Loc information acquisition part 304, broadcasting receiver 305, and communication receiver 306. The configuration of the reception device that performs the reception method in FIG. 7A corresponds to the case that Loc information acquisition part 304 is eliminated from the configuration in FIG. 8.

Identification information acquisition part 301 has a function of performing Step S301 in FIG. 7B. Specifically, identification information acquisition part 301 acquires the service information transmitted through the transmission channel constituting the entry point, and acquires the transmission channel identification descriptor (auxiliary information) included in the service information. Identification information acquisition part 301 interprets the information on the transmission channel identification descriptor.

Decision part 302 has a function of performing Step S302 in FIG. 7B, and decides the data to be received based on the playback capability of the terminal or the availability of the communication channel.

Communication combination-use determination part 303 has a function of performing Step S303 in FIG. 7B, and decides (determines) whether the data transmitted through the communication is to be received.

Loc information acquisition part 304 has a function of performing Step S304 in FIG. 7B, and acquires the location data of the communication-side data.

(Second Modification)

An example of the reception method in the case that the attribute information or the location information is stored in the program information on the broadcasting will be described in a second modification.

[Reception Method]

Figure 9:
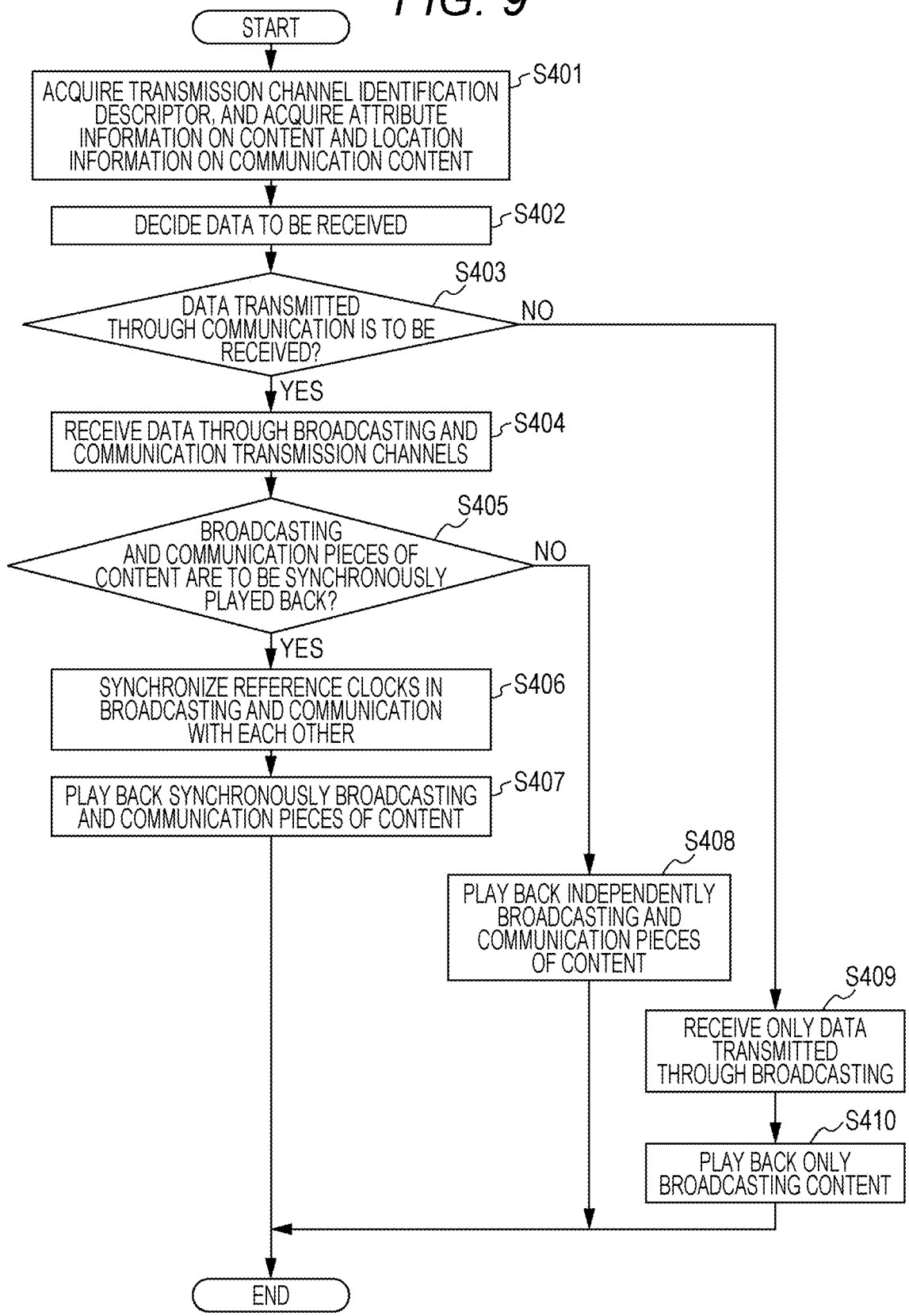
FIG. 9 is a flowchart illustrating an operation example on a reception side in broadcasting and communication cooperation service according to a second modification of the first exemplary embodiment.

FIG. 9 is a flowchart illustrating an operation example on the reception side in the broadcasting and communication cooperation service of the second modification of the first exemplary embodiment. FIG. 9 illustrates the operation example in which the reception device determines whether the broadcasting content and the communication content are to be synchronously played back and plays back the broadcasting content and the communication content in the case that the attribute information or the location information is stored in the program information on the broadcasting.

The operation in FIG. 9 is based on the operation in FIG. 7A. However, in the operation in FIG. 9, the transmission data is not the MMT asset but more general content.

The program information transmitted through the transmission channel constituting the entry point is acquired, the transmission channel identification descriptor included in the program information is acquired, and the attribute information on the content or the location information on the communication content is acquired (Step S401).

In the case that the entity of the location information is not stored in the program information, the data entity of the location information is acquired by the method similar to that in FIG. 7B.

The data to be received is decided based on the playback capability of the reception device or the availability of the communication channel (Step S402).

Whether the communication content is to be acquired is decided (Step S403). When the communication content is to be acquired (YES in S403), the flow goes to Step S404, and the data is received through both the transmission channels of the broadcasting and communication. When the communication content is not to be acquired (NO in S403), the flow goes to Step S409, and the data is received only through the broadcasting. In Step S410, only the broadcasting content is played back.

Whether the broadcasting content and the communication content are to be synchronously played back is determined (Step S405).

When the broadcasting content and the communication content are to be synchronously played back (YES in S405), the reference clocks of the broadcasting content and communication content are synchronized with each other in Step S406, and the broadcasting content and the communication content are synchronously played back in Step S407.

The reference clock synchronization in S406 may be performed in advance of the reception in S404. The reason is as follows. In the case that the playback of the reception data of the content is started after pre-buffering, sometimes the reception data is decoded and played back after confirmation of the reception of the data in which the PTS is T1 in the broadcasting content and the data in which the PTS is T1 in the communication content (at this point, it is assumed that the PTSs of the broadcasting content and communication content are already synchronized with each other). In determining whether the synchronously played back pieces of data are prepared, it is necessary that the reference clocks of the broadcasting content and communication content are already synchronized with each other.

The reference clock synchronization in S406 can be made based on either reference clock used in the broadcasting or communication. For example, in the case that the PCR (Program Clock Reference) is used in the broadcasting while the NTP (Network Time Protocol) is used in the communication, the reference clocks of the broadcasting content and communication content can be synchronized with each other by converting the NTP-based audio or video DTS or PTS into the PCR-based audio or video DTS or PTS. The DTSs or PTSs of the broadcasting and communication may be converted so as to be synchronized with an inherent clock used in the reception device.

The attribute information includes information indicating whether the pieces of reference clock information on the plurality of components are identical to each other, and the reception side can recognize that the pieces of the reference clock information differ based on the attribute information. In such cases, the reference clocks of the broadcasting content and communication content can be synchronized with each other by the above method.

In the operation of FIG. 9, the attribute information or the location information is transmitted while stored in the program information on the broadcasting. When the necessity of the synchronization playback is eliminated, the transmission channel identification descriptor in which the pieces of information are described does not need to be stored in the program information on the broadcasting.

The attribute information or the location information is stored in the program information on the broadcasting described in the second modification. Alternatively, in the case that the program information includes the transmission channel identification descriptor, the reception device may synchronously play back the stream in which the location information is described in the transmission channel identification descriptor and the broadcasting stream. At this point, the transmission channel identification descriptor does not need to include the attribute information indicating whether the streams transmitted through the broadcasting and the communication are to be synchronously played back.

In other words, the reception method of the second modification may include: the reception step of receiving the content transmitted using the broadcast wave and the content transmitted using the communication channel; and the playback step of playing back the content transmitted using the broadcast wave and the content transmitted using the communication channel while synchronizing the pieces of content, when the auxiliary information for synchronizing the content transmitted using the broadcast wave and the content transmitted using the communication channel is received.

[Reception Device]

Figure 10:
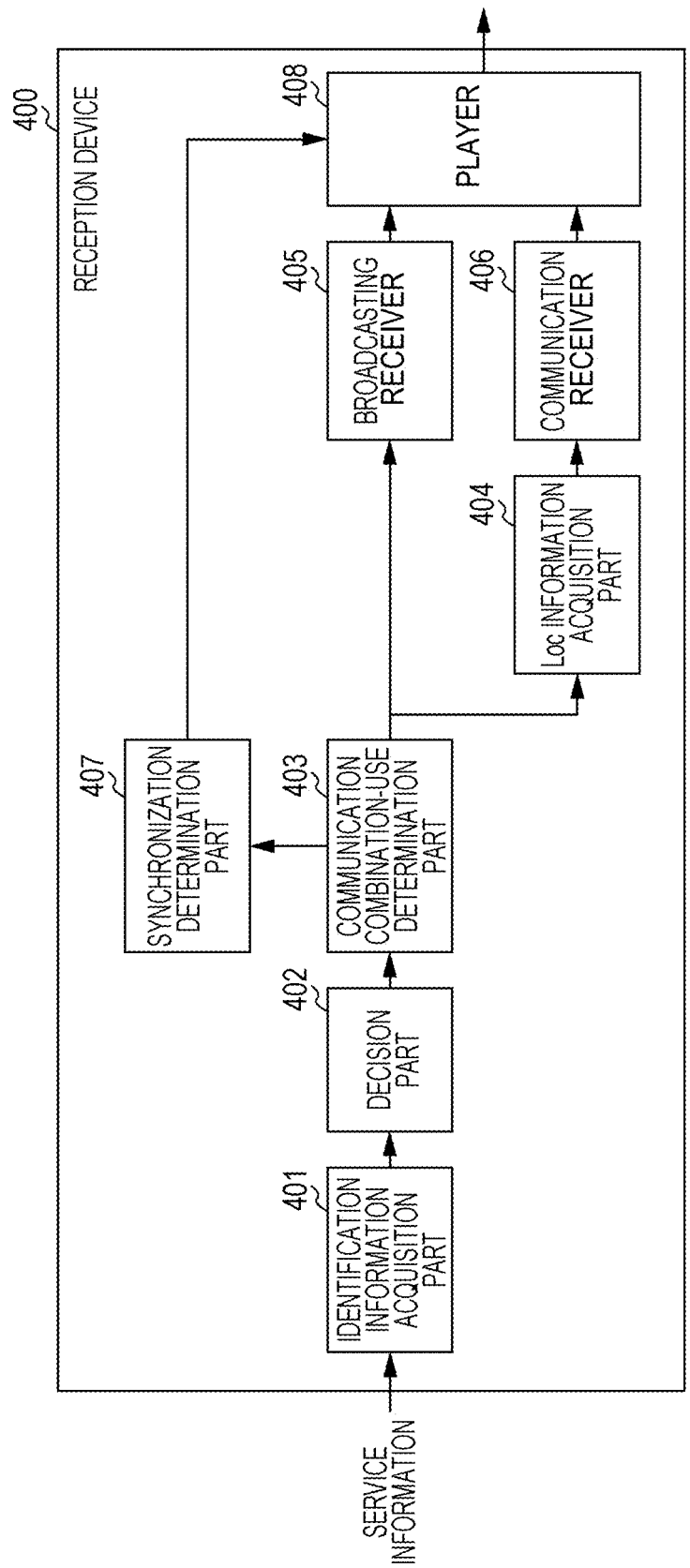
FIG. 10 is a block diagram illustrating a configuration example of a reception device of the second modification of the first exemplary embodiment.

FIG. 10 is a block diagram illustrating a configuration example of the reception device of the second modification of the first exemplary embodiment. FIG. 10 illustrates the configuration example of the reception device that performs the reception method in FIG. 9.

Reception device 400 in FIG. 10 includes identification information acquisition part 401, decision part 402, communication combination-use determination part 403, Loc information acquisition part 404, broadcasting receiver 405, communication receiver 406, synchronization determination part 407, and player 408.

Because identification information acquisition part 401 to communication reception part 406 are similar to identification information acquisition part 301 to communication reception part 306 in FIG. 8, the description is omitted.

Synchronization determination part 407 has a function of performing the processing in Step S405 of FIG. 9.

Player 408 decodes and plays back the broadcasting content or the communication content by the playback method decided based on determination results of communication combination-use determination part 403 and synchronization determination part 407.

(Third Modification)

Other examples different from those of the first and second modifications will be described below as a third modification.

[Others 1]

The transmission channel is not limited to the combination of the broadcasting and the communication, but the transmission channel may be a combination of the identical transmission channels such as the broadcasting and broadcasting and the communication and communication.

In the case that the information in the package unit is not indicated like the transmission channel identification descriptor, whether each asset is to be transmitted through the broadcasting or the communication or whether the asset transmitted through the communication exists in the package may be decided by interpreting the location information on each asset in FIGS. 1A and 1B.

(Location Information)

The location information may include the URL information on the acquisition destination of the asset. In the case that the acquisition destination is the URL, whether the asset is to be transmitted through the broadcasting or the communication can be decided based on whether the URL is the specific URL previously defined in the broadcasting service.

For example, in the case that the broadcasting asset is transmitted in the same stream as that of the message information on the MPT, the ID (for the MMT packet, packet_id) of the packet in which the asset data is stored is indicated as the acquisition destination of the broadcasting asset in the location information, and the URL is indicated as the acquisition destination for the asset transmitted through the communication. Accordingly, in the location information, whether the asset is to be transmitted through the communication may be decided based on whether the acquisition destination is the URL.

(Modification of Description of MPT)

In FIGS. 1A and 1B, the location information on each asset and the individual transmission channel identification descriptor are defined as the information on each asset. Alternatively, a field indicating an asset coding system may separately be provided. The coding system is information necessary for the decoding, and desirably the coding system is signaled in the information, such as the MPT, which can be acquired in advance of the decoding. For example, the information such as stream_type in the MPEG-2 system can be used.

For the coding system in which the scalable coding can be performed, whether the asset is the basic layer or the extension layer may be indicated together with the coding system.

The plurality of assets having the scalability are sometimes included in the identical MMT package as in a case that two pieces of video having the time scalability exist in the identical MMT package. At this point, information indicating that the asset in the extension layer corresponds to the asset in which basic layer may be indicated. For example, the asset ID of the asset in the corresponding basic layer may be indicated with respect to the asset in the extension layer. The assets in the extension layer and basic layer may be grouped, and a group ID may be allocated to each asset.

These pieces of information can be indicated in the program information on the broadcasting even in the case that the TS is used in the broadcasting while the DASH or RTP is used in the communication. For example, the dependence relationship (for example, the communication-side video stream corresponds to the extension layer) between the video stream transmitted through the broadcasting and the video stream transmitted through the communication or information indicating the communication-side audio or video coding system can be described in the PMT descriptor and the like. Whether the broadcasting-side stream and the communication-side stream are to be synchronously played back may be indicated.

(Information on Transmission Channel)

The information indicating whether the content data is to be transmitted only through the broadcasting or whether the content data is to be transmitted by the combination of the broadcasting and the communication may be stored in broadcasting program information such as the EPG.

For example, in the case that the data transmitted through the communication cannot be played back or recorded as in the case that the reception device is not connected to the communication network or that the reception device is not compatible with the data acquisition through the communication, message information indicating that the data cannot be played back or recorded may be displayed when viewing selection or recording reservation is performed from the EPG.

Information indicating whether the data transmitted through the communication can be acquired in advance of a broadcasting program start clock time may be stored. In particular, in a download type system such as the DASH, the communication-side data is downloaded in advance of the broadcasting program start, which allows the playback of both the broadcasting data and the communication data to be started at the broadcasting program start clock time.

For example, in the case that the communication-side data can be acquired in advance of the broadcasting program start clock time, the reception device may start the reception of the communication-side data before the broadcasting program start clock time. At this point, the reception start clock time can be fixed such that a predetermined buffering data amount or the data corresponding to the buffering time can be received at the broadcasting program start clock time.

For example, the similar operation may be performed in the broadcasting program recording reservation.

In the broadcasting, because a user can select the plurality of broadcasting programs at any time, even if the communication data of the broadcasting program next to the currently viewing channel is previously received, an advantage of previously receiving the communication data is eliminated when the viewing broadcasting program is switched. Therefore, the communication-side data may previously be buffered at a certain viewing clock time with respect to all the broadcasting programs which can be viewed after the certain viewing clock time and data of which is transmitted by the combination of the broadcasting and the communication. In the case that the pieces of data of all the broadcasting programs cannot be received, the broadcasting program may be selected and received within a receivable range.

The information indicating whether the broadcasting-side data and the communication-side data are to be synchronously played back may be included in the broadcasting program information such as the EPG, and the communication-side data may previously be buffered when the broadcasting-side data and the communication-side data are to be synchronously played back. When the broadcasting-side data and the communication-side data are not to be synchronously played back, the reception of the communication-side data may be started after the reception of the broadcasting-side data is started.

Even in the case that the EPG does not include such pieces of information, a similar message can be displayed by acquiring the similar information through analysis of the MPT in the MMT or the PMT during the use of the TS in the broadcasting.

The pieces of information may be stored in control information, such as a TMCC signal in the broadcasting system (ISDB-T) of Japan, which is used to decode the signal transmitted through the transmission channel.

Thus, the necessity of the reception through the communication can be determined during the decoding, and the start on the communication side can be advanced.

(Format)

The HTTP-based file format is not limited to the DASH, but the HTTP-based file format may be HLS (HTTP Live Streaming) or MSS (Microsoft Smooth Streaming). The content management information corresponding to the MPD also exists in the HLS or MSS, so that the relationship between the broadcasting-side data and the communication-side data can be indicated by the mechanism similar to that of the DASH.

On the communication side, the TS stream may be used, or the format in which the field indicating the time stamp is added to the leading four bytes of the TS packet may be used. The time stamp-added TS is used in various standards such as BD (Blu-ray (registered trademark) Disc) and IPTV forum.

[Others 2]

(Attribute Information and Location Information)

In the attribute information or the location information, the attribute of the whole content and the individual attribute of the audio or video stream may separately be stored.

For example, in the case that the DASH is used on the communication side, the attribute information on the whole content indicating that the broadcasting content and the communication content are to be synchronously played back or that the broadcasting content is the scalability basic layer while the communication content is the extension layer may be stored in the transmission channel identification descriptor or the like. On the other hand, the individual attribute of each stream such as the information identifying the audio or video of the synchronization playback target may be stored in the MPD.

As to an example of the individual attribute of each stream, in the case that the video in the broadcasting is correlated with sub-voice audio transmitted through the communication, the PID of the TS packet in which the video is stored and an audio track or segment in the DASH data such as an audio track ID or information identifying Adaptation Set or Representation may be correlated with each other in the MPD. At this point, the identification information on the broadcasting-side media may include an ID of the transport stream including the TS packet of the PID and a service ID in addition to the PID.

The content of the MPD is sometimes updated, and a distribution server of the DASH content manages the update information. Therefore, particularly the individual attribute of the stream is described in the MPD, which allows establishment of a balance between an advantage of reducing information exchange between a broadcasting content transmission device and a communication content transmission server and an advantage of rapidly starting the communication content reception start processing by storing the whole attribute in the information, such as the PMT, which is acquired during the broadcasting reception start.

The whole attribute and the individual attribute may be described in both or one of the descriptor such as the PMT in the broadcasting and the MPD. For example, in the broadcasting, the whole attribute and the individual attribute may be described in the descriptor of the application control information such as the AIT.

(Attribute Information)

Information indicating whether the pieces of clock information on the streams transmitted through the different transmission channels such as the broadcasting and the communication are synchronized with each other or a method for synchronizing the pieces of clock information on the streams may be included in the attribute information. In this case, the reception device may perform the clock synchronization based on the information.

For example, information identifying the following three methods may be described as the attribute information.

Method 1) The streams being the synchronization targets are based on a common clock, and the necessity of the clock synchronization between the streams is eliminated.

Method 2) Like the descriptor in the PMT, the synchronization is performed based on clock synchronizing information that is transmitted separately from the stream.

Method 3) Like TS timeline extension (13818-1: 2013/AMD6 (2nd WD)) that is currently standardized in MPEG, the synchronization is performed by referring to the independent stream including the information for the clock synchronization.

In method 3, the attribute information may include the PID of the TS packet in which the clock synchronizing stream is stored.

(Fourth Modification)

For example, in FIGS. 6A to 7B, the method for storing the location information and the like are described in the case that the data is transmitted using TS in the broadcasting while the data is transmitted using the DASH or RTP in the communication.

A specific example of the location information storage method will be described in a fourth modification.

FIG. 11 is a view illustrating an example of a data structure of service information in the broadcasting and communication cooperation service of the fourth modification of the first exemplary embodiment. FIG. 11 illustrates an example of a descriptor (location information descriptor) indicating the location information on the MPD or the like. The location information may be included in the transmission channel identification descriptor. Therefore, it may be considered that the location information descriptor corresponds to the transmission channel identification descriptor.

In the fourth modification, the descriptor is stored in the PMT or section data different from the PMT.

A transmission format indicating the type of the data entity referred to by the location information, the location information, and a field indicating synchronization information between the PCR in the broadcasting and the communication-side data are included in the information indicated by the descriptor.

It is assumed that the location information of the fourth modification indicates a reference destination of the data entity of the location information. The case that the data entity of the location information is the MPD is described by way of example, the MPD is indicated as the transmission format, and the synchronization information between the PCR and the NTP is indicated as the synchronization information.

Because the MPD is the location information used in the DASH, the DASH may be indicated as the transmission format, and the reference destination of the MPD may be indicated as the location. The field of the transmission format does not need to be included in the case that the transmission format can be identified by an extension in the URL of the location information. The MPD has the two ways of the case that the MPD is transmitted through the broadcasting and the case that the MPD is transmitted through the communication network. An MPEG-2 TS private section or the like is used in the case that the MPD is transmitted through the broadcasting. Accordingly, the identification information on the TS packet, such as the PID of the private section, in which the MPD is stored in the transport stream can be indicated as the location information on the MPD in the case that the MPD is transmitted through the broadcasting, and the information on the URL or the like can be indicated as the location information on the MPD in the case that the MPD is transmitted through the communication network.

[Reception Method]

An operation example of the reception device in the case that the descriptor indicating the location information is analyzed to synchronously play back the broadcasting content and the communication content will be described below as a reception method of the fourth modification.

Figure 12:
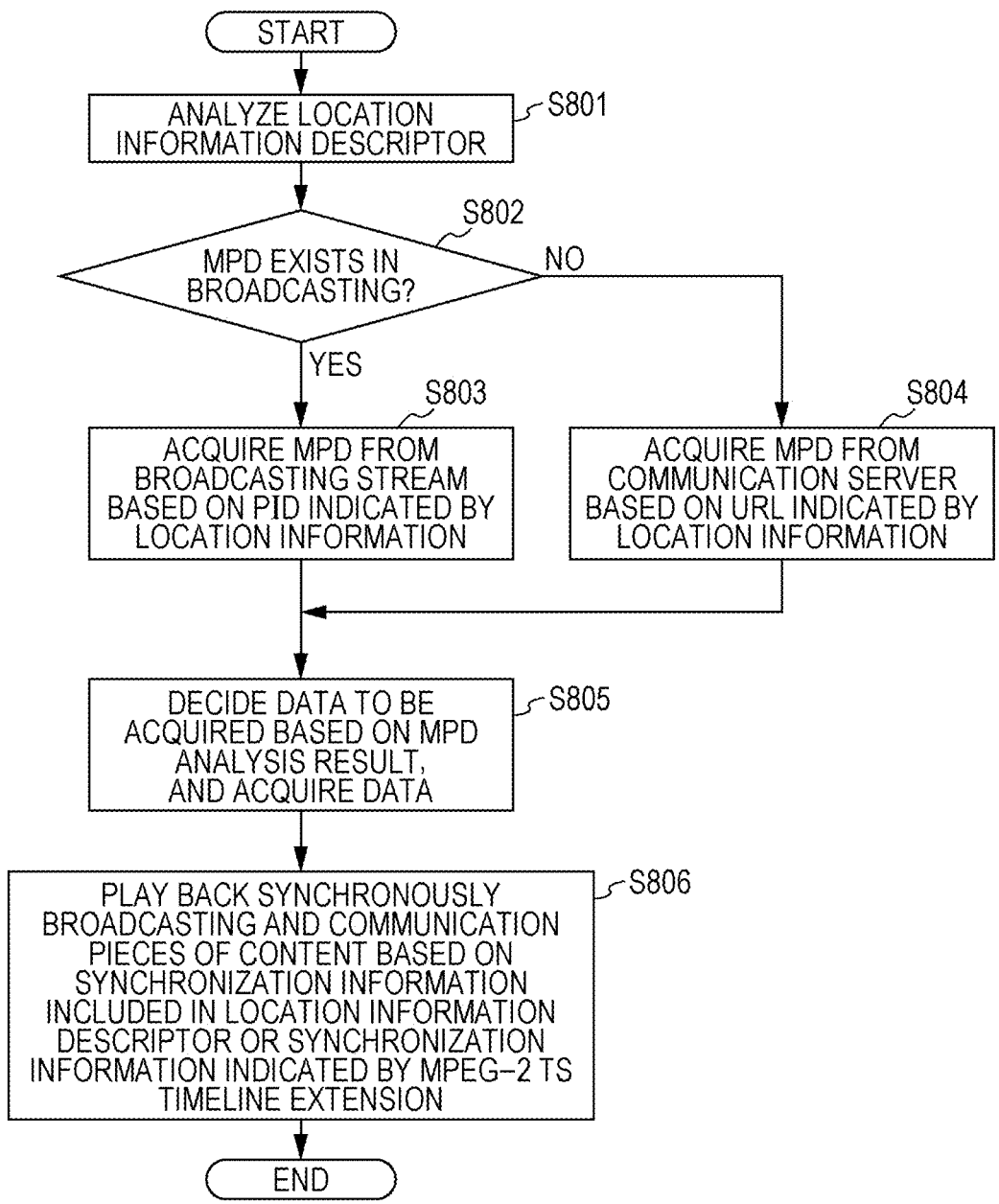
FIG. 12 is a flowchart illustrating an operation example on a reception side in the broadcasting and communication cooperation service of the fourth modification of the first exemplary embodiment.

FIG. 12 is a flowchart illustrating an operation example on the reception side in the broadcasting and communication cooperation service of the fourth modification of the first exemplary embodiment.

In Step S801, the location information descriptor stored in the PMT is analyzed.

In Step S802, whether the MPD exists in the broadcasting is determined. When the MPD exists in the broadcasting (the MPD is transmitted through the broadcasting) (YES in S802), the flow goes to Step S803, and the data entity of the MPD is acquired from the TS packet having the PID indicated by the location information. On the other hand, when the MPD does not exist in the broadcasting (NO in S802), the MPD is acquired from the communication server based on the URL indicated by the location information and the like.

In Step S805, based on an analysis result of the MPD, the data acquired from the DASH content is decided, and acquired by download (or progressive download).

In Step S806, the broadcasting content and the communication content are synchronously played back based on the synchronization information included in the location information descriptor or the synchronization information, which is acquired from the TS packet in which timeline extension information is stored in the case that the MPEG-2 TS timeline extension is used.

In the case that the timeline extension is used, the synchronization information does not need to be included in the location information descriptor. In the case that the DASH content and the broadcasting content need not to be synchronously played back, the synchronization information does not need to be transmitted. In this case, whether the pieces of content need to be synchronously played back may be determined based on the synchronization information on the location information descriptor or whether the synchronization information in the timeline extending data exists. Whether the synchronization playback needs to be performed may separately be indicated.

When the synchronization playback does not need to be performed, the start and stop of the playback of the DASH content can be decided based on a user instruction or a control command in a hybridcast application in Step S806. In this case, it is assumed that whether the data is to be acquired through the communication is decided in a preceding step of S801.

In FIG. 12, by way of example, the MPD is acquired to play back the DASH content. The same holds true for the case that the data of other system such as the RTP and the TS are acquired and played back.

In the timeline extension, an access unit in which the timeline extension information is stored is defined, and both the descriptor indicating the location information and the descriptor indicating the synchronization information can be stored in the access unit.

Accordingly, without the transmission of the location information descriptor, the location information and the synchronization information may be indicated by the timeline extension. Because the PID cannot be indicated as the location information in the current timeline extension, the PID can be signaled by extending a field indicating a scheme type of the location information.

An upper limit of a section size of the PMT is restricted to 1021 bytes, and sometimes the section size of the PMT exceeds the upper limit depending on the URL in the location information. Although the PMT section can be divided and stored, desirably the PMT is particularly stored in one section.

Accordingly, in the case that the section size of the PMT exceeds 1021 bytes, the location information descriptor may be transmitted by a section different from the PMT. In the case that the location information indicates the PID, the location information can fall within the upper limit of the section size of the PMT, and the location information can be included in the PMT. Therefore, the section in which the location information is stored may be changed based on whether the location information is the PID or the URL.

(Fifth Modification)

In the description of the fourth modification, the location information can be indicated even in the TEMI (Timeline and Extend Media Information stream) access unit of the timeline extension.

Specifically, the URL of the communication-side content and the like can be described using temi_location_descriptor. In temi_location_descriptor, the URLs of the plurality of pieces of content can be described, and flexible operation can be performed with respect to the description of the URL because the restriction of the data size does not exist unlike the section size of the PMT.

In the case that the PID of the TS packet in the transport stream is indicated as the location information, the location information has the small data size, and the location information is acquired during the analysis of the PMT by referring to the location information descriptor, which allows the reduction of the delay time relevant to the acquisition. Therefore, desirably both the location information descriptor and temi_location_descriptor in the TEMI access unit can be used as a storage site of the location information.

An example of a syntax (data structure) of the location information descriptor according to a fifth modification will be described below.

FIG. 13A is a view illustrating a syntax example of the location information descriptor of the fifth modification of the first exemplary embodiment. FIG. 13A illustrates a syntax example of the location information descriptor that is used to store the location information in one of the location information descriptor and the TEMI access unit.

In the description of the fifth modification, it is assumed that the information on the synchronization with the PCR is not included in the location information descriptor, but described using temi_timeline_descriptor of the TEMI access unit. Semantics of each field in FIG. 13A will be described.

"data_format" is similar to the transmission format in FIG. 11. That is, "data_format" indicates the format of the meta-information on the playback control used in the service, such as the MPD in the DASH, the playback control meta-file in VOD (Video On Demand) specifications of the IPTV forum, and TTS (Time-stamp TS) defined by the IPTV forum. "data_format" may indicate not the meta-information such as the TTS, the MP4 file, and the AV coded data, but the identification information such as the stream. "data_format" may indicate the MPT in the MMT, the PA message, the MMT packet, or the asset.

For example, the time scalability can be implemented in the video coding system such as H.265. It is assumed that the basic layer is transmitted at the frame rate of 60 fps through the broadcasting, and that the coded data of the extension layer is transmitted in order to improve the frame rate from 60 fps to 120 fps through the communication. In this case, only the URL of the coded stream in the extension layer needs to be indicated as the location information on the communication content. The information such as the resolution and the coding system in the coded stream can be acquired in the broadcasting data in which the basic layer is transmitted.

"location_type" is used to identify whether the location information is indicated by the PID of the TS in the broadcasting or the URL in the communication. It is assumed that "location_type" indicates the PID of the TS in the broadcasting for location_type=0. For example, the location information descriptor can be used outside the TS like the MMT (MPEG Media Transport) of the MPEG.

"location_type" does not need to be used in the format other than the TS. For example, another piece of information such as packet_id of the MMT packet in the MMT may be used in order to identify the location.

"PID" indicates a PID of the TS packet. In the case that the broadcasting is constructed with the plurality of transport streams, the identification number of the transport stream and the like may also be stored.

"url_location" indicates which one of the location information descriptor and the TEMI access unit stores the URL of the communication content therein. In the fifth modification, it is assumed that the URL of the communication content is stored in the location information descriptor for url_location=0. It is also assumed that the URL of the communication content is stored in temi_location_descriptor of the TEMI access unit for url_location=1.

"url_length" indicates a byte length of "url_path". "url_path" indicates URL data.

FIG. 13B is a view illustrating a syntax example of the location information descriptor of the fifth modification of the first exemplary embodiment. FIG. 13B illustrates another syntax example different from the syntax of the location information descriptor in FIG. 13A. The syntax in FIG. 13B differs from the syntax in FIG. 13A in that data_format field does not exist in the case that the location information is stored in the TEMI access unit.

At this point, temi_location_descriptor can indicate a TEMI service type in a field called service_type. The service type corresponds to data_format. Accordingly, it is assumed that the information on data_format is indicated in service_type field.

Sometimes both data_format field and service_type of temi_location_descriptor exist in the syntax of FIG. 13A. In this case, it is assumed that data_format field and service_type of temi_location_descriptor indicate the identical information.

In temi_location_descriptor, only the URL of the communication content can be indicated without signaling service_type. Accordingly, in the case that the syntax in FIG. 13A is used, data_format of the location information descriptor is referred to as the transmission format, and service_type of temi_location_descriptor does not need to be signaled.

FIG. 13C is a view illustrating a syntax example of the location information descriptor of the fifth modification of the first exemplary embodiment. FIG. 13C illustrates still another syntax example different from the syntax of the location information descriptors in FIGS. 13A and 13B.

The syntax in FIG. 13C differs from the syntax in FIG. 13A in that conditional branching of url_location is performed at the beginning. That is, in the case that the location information exists in the location information descriptor for url_location=0, the PID of the TS in the broadcasting or the communication URL is stored according to location_type. On the other hand, for url_location=1, location_type is not described in the location information descriptor, but location_type is indicated in the service_type field of temi_location_descriptor in the TEMI access unit, and the PID of the TS in the broadcasting or the communication URL is stored in temi_location_descriptor.

FIG. 13D is a view illustrating a syntax example of the location information descriptor of the fourth modification of the first exemplary embodiment. FIG. 13D illustrates yet another syntax example different from the syntax of the location information descriptors in FIGS. 13A to 13C.

The syntax in FIG. 13D differs from the syntax in FIG. 13A in that url_location and location_type are integrated.

The syntax in FIG. 13D indicates the broadcasting PID for location_type=0, and indicates the communication URL for location_type=1. The case of location_type=2 indicates that the PID of the TS in the broadcasting or the communication URL is stored in temi_location_descriptor of the TEMI access unit.

The data or data structure of the syntax of the location information descriptor is not limited to the above examples. For example, a combination with another piece of data may be used by integrating the location type and the format type. For example, the field of the transmission format does not need to be included in the case that the transmission format can be identified by an extension in the URL of the location information. For example, when the location information descriptor does not exist, the location information is indicated by temi_location_descriptor, and the url_location field may be eliminated.

(Sixth Modification)

Another example different from the location information of the fifth modification will be described below.

(Another Example of Location Information)

For example, sometimes the plurality of TEMI streams are included in each kind of the timeline in the case that a plurality of timelines of at least two kinds exist in the identical program.

In this case, the plurality of pieces of location information may be stored in the location information descriptor. In the case that the plurality of pieces of location information are stored, loops as many as the number of TEMI streams are produced in the location information descriptor, and the location information corresponding to each TEMI stream is stored. As a method for indicating the correlation between the plurality of location information loops and the plurality of TEMI streams in the location information descriptor, for example, a correlation may be indicated by the correspondence between the order of the loop of the location information and the order of an ES loop (PMT second loop) indicating the TEMI stream. In the case that at least two kinds of timelines exist, the location information may be stored not in the location information descriptor but in temi_location_descriptor of the TEMI access unit, or the location information descriptor may be stored in the ES loop (PMT second loop).

(Update of Location Information)

Desirably the update of the content of the location information such as the meta-information can be dealt with.

For example, a reload flag is added to the location information descriptor in the PMT, the reload flag is set to 1 in the case that the content of the location information is to be updated, and the reception device may determine that the content of the location information is updated for reload=1, and reacquire the PID or URL stored in the location information. In the case that the location information on the PID or URL is not updated while only the data is updated, only the data may be reacquired.

Information indicating whether the content of the location information or the data such as the MPD the acquisition destination of which is indicated by the location information is updated may independently be indicated.

The location information descriptor in the periodically-transmitted PMT may sequentially be checked. Alternatively, since the sequential checking processing is heavy, the section data to store the location information descriptor and the like or the event section for making a notification of the update may separately be generated, and periodically be transmitted.

In the reception device, whether the location information is updated can be determined when the version number is confirmed in the section. In the case that the location information is transmitted by the broadcasting section, the update of the meta-information is indicated by updating the version number of the section of the location information.

After the acquisition of the communication-side data is started based on the location information acquired from the broadcasting, the update content of the location information may be acquired through the communication.

[Reception Method]

An operation example of the reception device in the case that the descriptor indicating the location information is analyzed to synchronously play back the broadcasting content and the communication content will be described below as a reception method of the sixth modification.

FIG. 14 is a flowchart illustrating an operation example on the reception side in the broadcasting and communication cooperation service of the sixth modification of the first exemplary embodiment.

Step S804 in FIG. 12 is changed to Steps S906, S907, and S908 in FIG. 14. Because other operations (Steps S901 to S905) are similar to the operations in FIG. 12 (Steps S801 to S803, Steps S805, and S806), the description is omitted.

Which one of the location information descriptor and the TEMI access unit stores the URL of the acquisition destination of the MPD therein is determined in Step S906. When the URL exists in the location information descriptor (YES in S906), the flow goes to Step S907, the location information descriptor is analyzed, and the MPD is acquired from the communication server based on the URL indicated by the location information. On the other hand, when the URL exists in the TEMI access unit (NO in S906), the MPD is acquired from the communication server based on the URL indicated by temi_location_descriptor of the TEMI access unit.

FIG. 14 illustrates the case that the MPD is indicated as the format information by way of example. However, even in the case of another piece of meta-information, the broadcasting content and the communication content can be synchronously played back by the flow of operation similar to that in FIG. 14.

Figure 15:
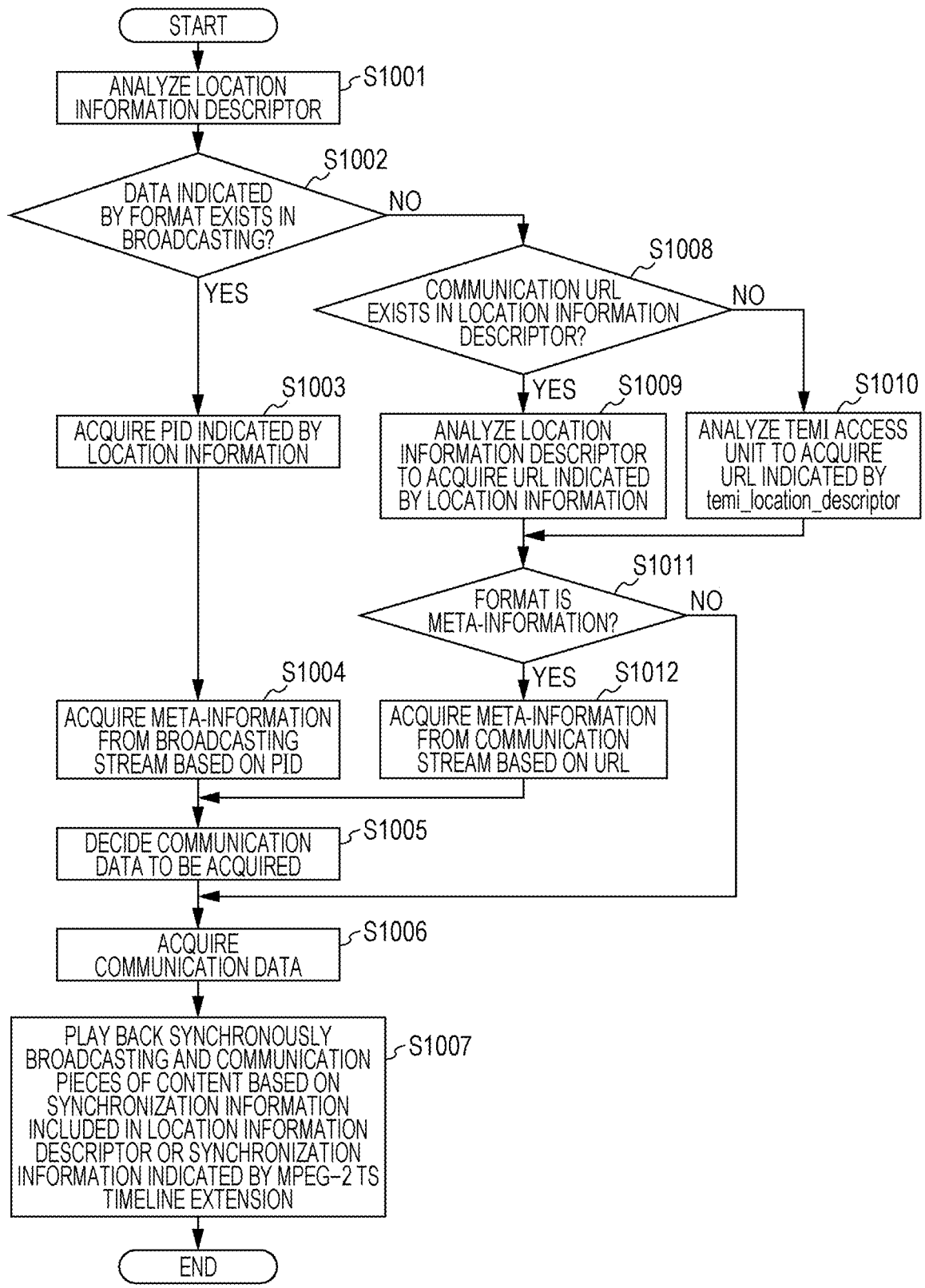
FIG. 15 is a flowchart illustrating another operation example on the reception side in the broadcasting and communication cooperation service of the sixth modification of the first exemplary embodiment.

FIG. 15 is a flowchart illustrating another operation example on the reception side in the broadcasting and communication cooperation service of the sixth modification of the first exemplary embodiment. FIG. 15 illustrates operation in the case that the format information is another piece of meta-information other than the MPD. More specifically, FIG. 15 illustrates the operation to acquire the URL of the data entity of the stream instead of the URL of the meta-information in Step S907 or S908 of FIG. 14 in the case that not the meta-information such as the MPD but the format of the data entity of the stream is indicated in the format information.

In Step S1001, the reception device analyzes the location information descriptor.

Whether the data indicated by the format exists in the broadcasting is determined (Step S1002). When the data exists in the broadcasting (YES in S1002), the flow goes to Step S1003, and the PID indicated by the location information is acquired. At this point, because it is not considered that the data entity such as the stream is included in the broadcasting, the format is decided to be meta-data when the data exists in the broadcasting.

The meta-information file is acquired from broadcasting stream based on the PID (Step S1004), and the communication data to be acquired is decided (Step S1005).

On the other hand, when the data exists in the communication (NO in S1002), the flow goes to Step S1008, and whether the URL of the communication data exists in the location information descriptor or temi_location_descriptor of the TEMI access unit. The URL is acquired in Step S1009 or S1010 depending on each case.

Whether the format is the meta-information is determined in Step S1011. When the format is the meta-information (YES in S1011), the flow goes to Step S1012, the meta-information is acquired from the communication stream based on the URL. Then the flow goes to Step S1005, and the communication data to be acquired is decided.

After the communication data to be acquired is decided in Step S1005, or when the format is determined to be not the meta-information in Step S1011, the flow goes to Step S1006, and the communication data is acquired.

Finally, in Step S1007, the broadcasting content and the communication content are synchronously played back based on the synchronization information included in the location information descriptor or the synchronization information indicated by the MPEG-2 TS timeline extension.

(Seventh Modification)

In the above description, whether the broadcasting content and the communication content are to be synchronously played back is determined, and the broadcasting content and the communication content are acquired and synchronously played back when the broadcasting content and the communication content are to be synchronously played back.

On the other hand, in the description of a seventh modification, information indicating whether the audio or video reference clock information transmitted through the broadcasting is identical to the audio or video reference clock information transmitted through the communication is included in the service information (such as the transmission identification descriptor), and the operation is performed based on the information.

[Information Indicating Whether Reference Clocks (Timelines) of Broadcasting and Communication are Synchronized with Each Other]

In the case that the broadcasting content and the communication content are transmitted using the MMT, the DASH, the RTP, or the hybridcast, the information indicating whether the audio or video reference clock information transmitted through the broadcasting is identical to the audio or video reference clock information transmitted through the communication may be stored in the transmission identification descriptor, the program information, the EPG, or the EIT.

For example, in the case that the content transmitted through the broadcasting and the content transmitted through the communication are operated based on a common reference clock (such as the provision of the time stamp), information indicating that the pieces of content transmitted through the broadcasting and communication are operated based on the common reference clock is stored. In the case that the content transmitted through the broadcasting and the content transmitted through the communication are operated based on different reference clocks, information indicating that the pieces of content transmitted through the broadcasting and communication are operated based on the different reference clocks is stored.

Only in the case that different pieces of reference clock information are used in the broadcasting and communication, information (such as timeline extension information) necessary for the reference clock synchronization may be indicated. A storage site or a kind of the information necessary for the reference clock synchronization and a reference clock synchronization method may be indicated.

The reference clock synchronization can be made based on either reference clock used in the broadcasting or communication.

For example, in the case that the PCR (Program Clock Reference) is used in the broadcasting while the NTP (Network Time Protocol) is used in the communication, the kind or method of the reference clock synchronization may be indicated by, for example, an indication that the reference clocks of the broadcasting content and communication content can be synchronized with each other by converting the NTP-based audio or video DTS or PTS into the PCR-based audio or video DTS or PTS. The kind or method of the reference clock synchronization may be indicated by, for example, an indication that the DTSs or PTSs of the broadcasting and communication are converted so as to be synchronized with the inherent clock used in the reception device.

The identification information indicating the kind or method of the information necessary for the reference clock synchronization may be analyzed to perform the reference clock synchronization by the method based on the identification information.

In the case that the plurality of streams have different reference clocks, information indicating that the plurality of streams have different reference clocks may be stored in the descriptor. The descriptor may be indicated in each of the different reference clocks, or the different reference clocks may be indicated by one descriptor. Information indicating the correlation between the reference clock and the program in which the reference clock is used may be stored.

Information indicating whether the reference clocks are identical to each other may be indicated as the above descriptor, or another descriptor, a table, or a section may be used as the information. Information indicating whether the reference clocks are identical to each other may be indicated based on whether the information (such as the timeline extension information) necessary for the clock synchronization exists. The difference of the clock information can be indicated by the fact that the information necessary for the clock synchronization exists. Alternatively, the difference of the clock information may be indicated using the communication content attribute information (such as information on the format or kind and an extension described in the location information or URL) described in the transmission identification descriptor.

For the hybridcast, the difference of the clock information may be stored in an AIT-controlled section or an application.

The reception device synchronizes the broadcasting reference clock information and the communication reference clock information when determining that different pieces of clock information are used. When determining that the common clock information is used, the reception device decides that the clock synchronization is unnecessary. For example, the reception device may synchronize the reference clock of the content transmitted using the communication channel with the reference clock of the content transmitted using the broadcast wave based on the difference information when the reception device receives the auxiliary information including the difference information between the reference clock of the content transmitted using the broadcast wave and the reference clock of the content transmitted using the communication channel, and the reference clock of the content transmitted using the broadcast wave differs from the reference clock of the content transmitted using the communication channel.

The reception device may determine whether the reference clocks of the broadcasting content and communication content are actually to be synchronized with each other in consideration of all the pieces of information such as the user selection or user setting through a user interface, a content provider or a service provider, an intention of a broadcasting station, specifications of the reception device, and an intention of a receiver manufacturer in addition to the identification result that is stored in transmission identification descriptor to indicate whether the pieces of reference clock information on the data are identical to each other.

When determining that the reference clock synchronization is to be performed, the timing at which the reception device actually starts the synchronization may be after the determination, or at the time before the determination when the information on the synchronization is acquired. Alternatively, the synchronization may be performed according to the time the acquisition of the communication content is started (for example, a given time before the acquisition of the content is started, or the same time as the start of the acquisition).

In the case that the playback of the clock of the reference clock (for example, broadcasting PCR) being the reference source is not completed (for example, the clock cannot be used because an influence of jitter has not been smoothed yet), the clock synchronization with the reference destination may be started at the time the playback of the clock of the reference clock information on the reference source is completed.

In the case that the information indicating whether the broadcasting reference clock and the communication reference clock are synchronized with each other is indicated by the EPG, similarly to pro-buffering of the communication content, whether the synchronization of the reference clock is required or the synchronization of the reference clock may be started before the start of the broadcasting. Thus, the service can earlier be provided to the viewer by performing the synchronization of the reference clock as soon as possible.

The information indicating whether the reference clocks are identical to each other can be applied not only the combination of the broadcasting and the communication but other cases as long as the different pieces of reference clock information are used in the data acquired through the identical channel or the plurality of channels such as the broadcasting, the communication, and the accumulation format.

A part of or all the functions or pieces of processing described in the seventh modification may be mounted by hardware or software. The functions or pieces of processing described in the seventh modification can partially be mounted by hardware or software.

For example, in the case that the functions or pieces of processing are mounted by software, instructions of the functions or pieces of processing described in the seventh modification may be issued, PUSH may notify the state of the reception function, or the functions acquired by PULL may be packaged and provided as an API function.

The API function can be performed from an application. In the case that the functions or pieces of processing are mounted as the application, the functions or pieces of processing may be mounted using a resident application or an application such as HTML5. The API may be mounted as data delivery and receipt between applications or a state notification.

Example of the functions of the API function relevant to the information indicating whether the reference clocks are synchronized with each other include the following items 1) to 9).
1) Information indicating whether the reference clock information on the broadcasting content is identical to the reference clock information on the communication content is acquired.
2) Information indicating whether the reference clock synchronization is required is acquired.
3) The kind or synchronization method of each piece of reference clock information is acquired.
4) Information (such as timeline information) necessary for the clock synchronization is acquired.
5) The acquisition destination of the information necessary for the clock synchronization is acquired.
6) The clock information on a reference source is set to an argument, and the clock information on a reference destination in which the broadcasting content and the communication content are synchronized with each other is returned. For example, in the case that the broadcasting content and the communication content are not synchronized with each other, a value indicating that the broadcasting content and the communication content are not synchronized with each other is returned.
7) Each instruction to start the reference clock synchronization is issued.
8) A state indicating whether the reference clocks are synchronized with each other is acquired.
9) A notification that the reference clocks are synchronized with each other is made.

[Reception Method]

An operation example in which the reception device determines whether the broadcasting content and the communication content are to be synchronously played back and plays back the broadcasting content and the communication content in the case that the attribute information or the location information is stored in the program information on the broadcasting will be described below as a reception method of the seventh modification with reference to FIG. 16.

Figure 16:
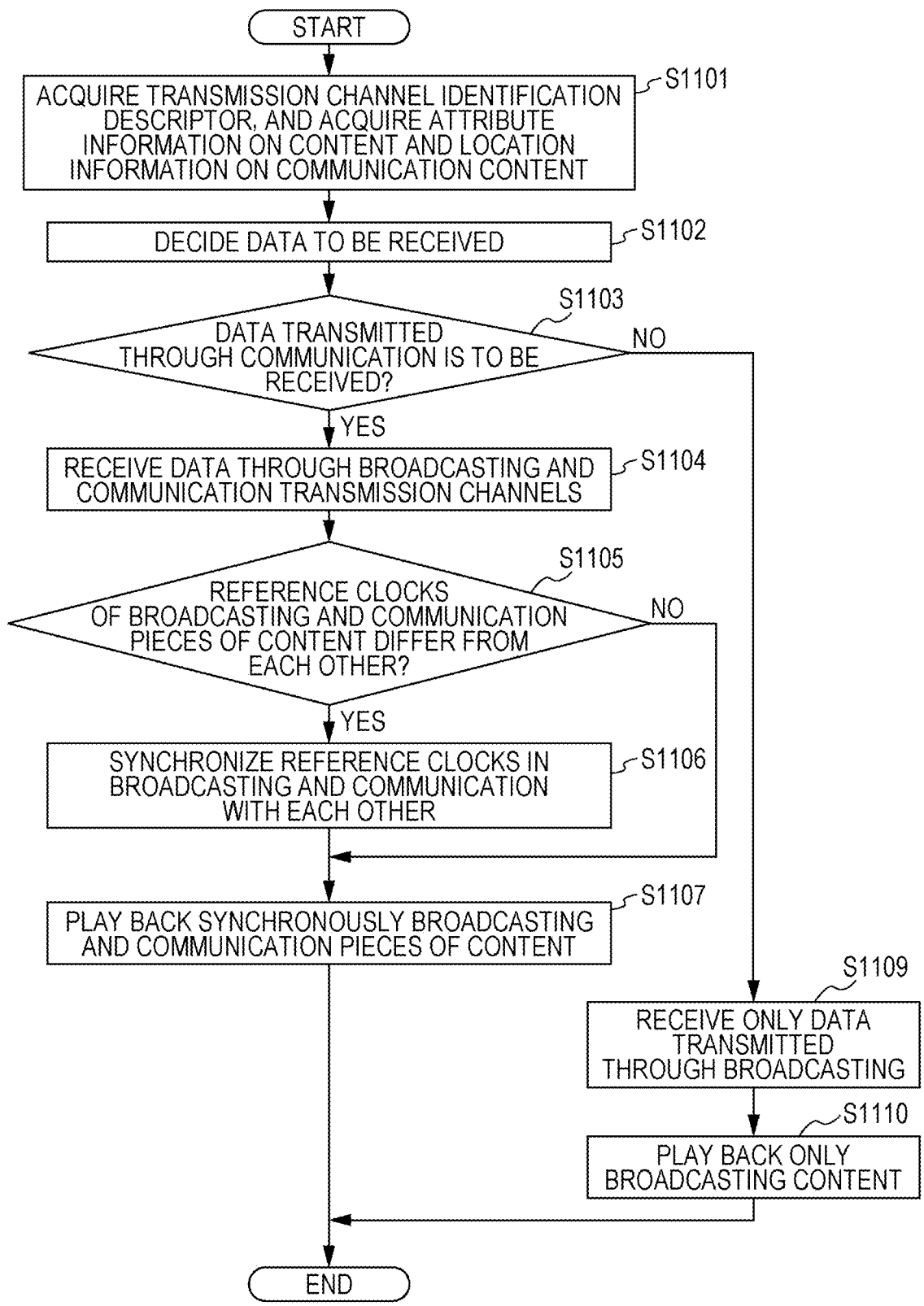
FIG. 16 is a flowchart illustrating an operation example on a reception side in broadcasting and communication cooperation service according to a seventh modification of the first exemplary embodiment.

FIG. 16 is a flowchart illustrating an operation example on the reception side in the broadcasting and communication cooperation service of the seventh modification of the first exemplary embodiment. The operation of the flowchart in FIG. 16 can be applied to the broadcasting and communication cooperation service in which any combination of multiplexing systems such as the MMT, the DASH, and the RTP is used. The operation can also be applied to the hybridcast.

In FIG. 16, the determination whether the broadcasting content and the communication content are to be synchronized with each other is eliminated on the assumption that the broadcasting content and the communication content are to be synchronized with each other.

Because Steps S1101 and S1102 are similar to Steps S401 and S402 in FIG. 9, the description is omitted.

In Step S1103, the reception device decides whether the communication content is to be acquired. When the communication content is to be acquired (YES in S1103), the flow goes to Step S1104, and the data is received through both the transmission channels of the broadcasting and communication. Whether the reference clocks of the broadcasting content and communication content are identical to or different from each other is determined in Step S1105.

When the reference clocks of the broadcasting content and communication content are different from each other (YES in S1105), the flow goes to Step S1106, and the reference clocks are synchronized with each other. The broadcasting content and the communication content are synchronously played back in Step S1107.

On the other hand, when the reference clocks of the broadcasting content and communication content are identical to each other (NO in S1105), the reference clocks are not synchronized, but the synchronization playback is performed using the common clock.

Whether the reference clocks need to be synchronized with each other may be determined after the processing in Step S1105. For example, whether a capability of the reception device meets the clock synchronization, whether the receiver has the specification of the clock synchronization, or whether the user performs the clock synchronization is determined according to the kind or method of the clock synchronization. Whether the broadcasting and communication reference clocks are to be synchronized with each other is comprehensively determined through the processing in Step S1105 and the above determination result, and the flow may go to Step S1106 or S1107.

The reference clock synchronization in S1106 may be performed in advance of the reception in S1104. In the case that the playback of the reception data of the content is started after pre-buffering, sometimes the reception data is decoded and played back after the confirmation of the reception of the data in which the PTS is T1 in the broadcasting content and the data in which the PTS is T1 in the communication content (at this point, it is assumed that the PTSs of the broadcasting content and communication content are already synchronized with each other). In determining whether the synchronously played back pieces of data are prepared, it is necessary that the reference clocks of the broadcasting content and communication content are already synchronized with each other.

In the case that the clock synchronization information cannot be acquired in Step S1106, or in the case that the clock synchronization cannot be performed due to the specification of the receiver, sometimes the broadcasting and communication cooperation service cannot be provided to the user. In such cases, whether the data transmitted through the communication is to be received may be determined in Step S1103 based on whether it is necessary to perform the synchronization or whether playback can be performed without performing the synchronization.

In Step S1103, whether the data transmitted through the communication is actually to be received may be determined in consideration of all the pieces of information such as the user selection or user setting, the content provider or service provider, the intention of the broadcasting station, the specifications of the reception device, and the intention of the manufacturer in addition to the information that can be identified by the transmission channel identification descriptor.

[Reception Device]

Figure 17:
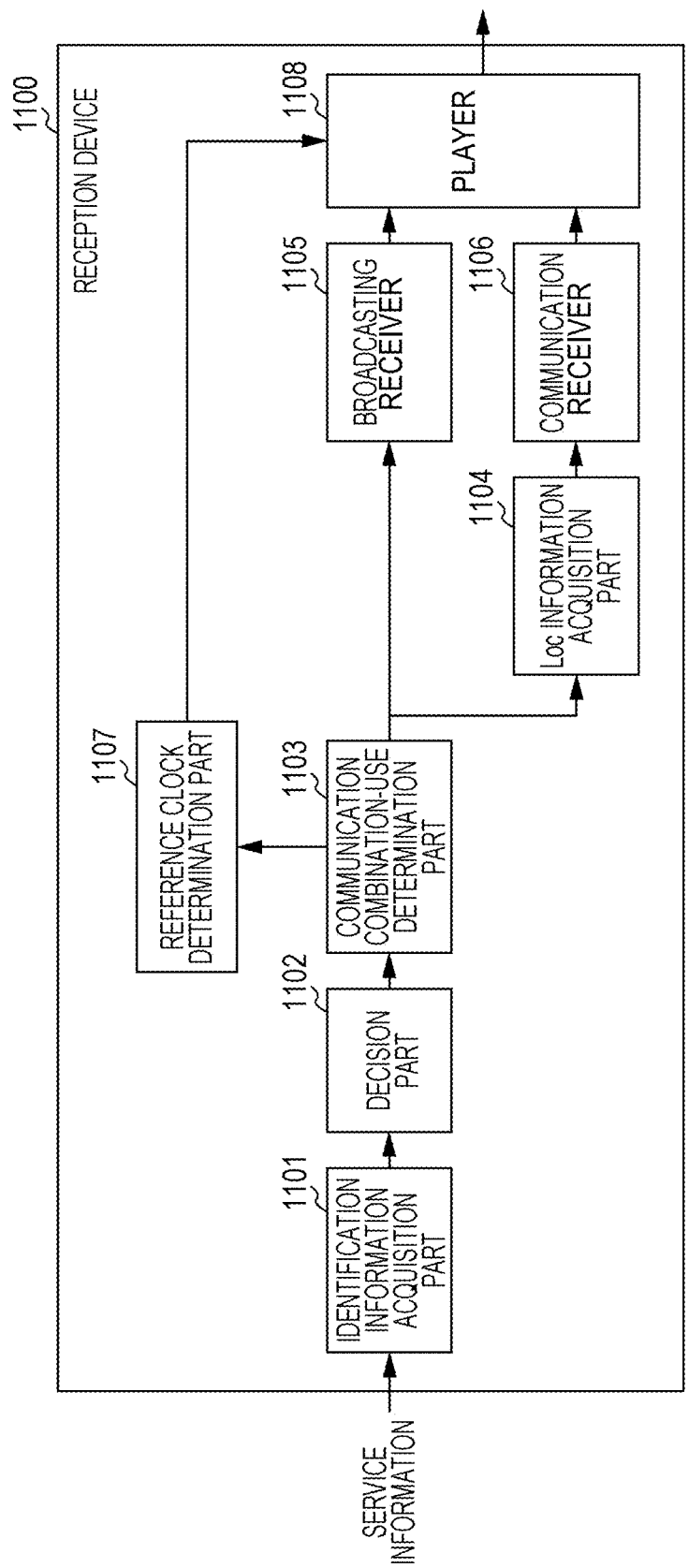
FIG. 17 is a block diagram illustrating a configuration example of a reception device of the seventh modification of the first exemplary embodiment.

A configuration example of the reception device performing the operation in FIG. 16 will be described below. FIG. 17 is a block diagram illustrating the configuration example of the reception device of the seventh modification of the first exemplary embodiment.

Reception device 1100 in FIG. 17 includes identification information acquisition part 1101, decision part 1102, communication combination-use determination part 1103, Loc information acquisition part 1104, broadcasting receiver 1105, communication receiver 1106, reference clock determination part 1107, and player 1108.

Because identification information acquisition part 1101 to communication reception part 1106 are similar to identification information acquisition part 301 to communication reception part 306 in FIG. 8, the description is omitted.

Reference clock determination part 1107 has a function of performing the processing in Step S1105 of FIG. 16. Reference clock determination part 1107 may determine whether the reference clock synchronization is required after determining whether the reference clocks are different from each other.

When the reference clocks are different from each other, player 1108 synchronizes the reference clocks with each other based on the determination result of reference clock determination part 1107, and decodes and plays back the broadcasting content or the communication content.

The function, the configuration of the reception device, and the reception method of the seventh modification are described above by way of example. The function, the configuration of the reception device, and the reception method of the seventh modification are not limited to the above description, but any function, configuration of the reception device, and reception method may be used as long as the similar function and effect can be implemented.

[Effect of First Exemplary Embodiment and the Like]

As described above, the first exemplary embodiment can provide the transmission method, reception method, transmission device, and reception device in which the reception side can play back the content by the combination of the broadcasting and the communication even if the timing of starting the reception of the content through the communication is delayed.

Specifically, the transmission method according to one aspect of the present disclosure for enabling transmission of content using the broadcast wave and the communication channel, the transmission method includes the information transmission step of transmitting the auxiliary information using at least the broadcast wave, the auxiliary information for synchronizing the content transmitted using the broadcast wave and the content transmitted using the communication channel when the content is transmitted using the broadcast wave and the communication channel, the auxiliary information causing the reception side to synchronize the content transmitted using the broadcast wave and the content transmitted using the communication channel when the reception side receives the auxiliary information.

Thus, when the content is transmitted using the broadcast wave and the communication channel, the auxiliary information is transmitted in order to synchronize the content transmitted using the broadcast wave and the content transmitted using the communication channel, so that the reception side can synchronize the content transmitted using the broadcast wave and the content transmitted using the communication channel when receiving the auxiliary information.

In the information transmission step, the auxiliary information may be transmitted in advance of the transmission of the content, and the auxiliary information further may include location information indicating an acquisition destination of the content or information indicating an acquisition destination of the location information.

In the auxiliary information transmission step, the auxiliary information may be transmitted while difference information between a reference clock of the content transmitted using the broadcast wave and a reference clock of the content transmitted using the communication channel is included in the auxiliary information.

In the auxiliary information transmission step, when the reference clocks of the pieces of content differ, the auxiliary information transmission may cause the reception side to achieve the synchronization through synchronization of the reference clock of the content transmitted using the communication channel with the reference clock of the content transmitted using the broadcast wave based on the difference information.

The transmission method may further include the generation step of generating the content in a format compatible with MMT (MPEG Media Transport), and the content transmission step of transmitting the content in the format generated in the generation step.

In the generation step, the content may be generated while the auxiliary information is included in the message information being the information on the acquisition of the content.

The reception method according to another aspect of the present disclosure includes: the reception step of receiving the content transmitted using the broadcast wave and the content transmitted using the communication channel; and the playback step of playing back the content transmitted using the broadcast wave and the content transmitted using the communication channel while synchronizing the pieces of content, when the auxiliary information for synchronizing the content transmitted using the broadcast wave and the content transmitted using the communication channel is received.

Thus, the service information transmitted through the transmission channel, such as the broadcast wave, which constitutes the entry point, is acquired, and the synchronization processing can be performed when the auxiliary information is included in the service information.

In the reception step, the content may be received by acquiring the content based on location information indicating an acquisition destination of the content when the auxiliary information is received in advance of the reception of the content and the auxiliary information includes the location information.

In the reception step, the content may be received by acquiring location information indicating an acquisition destination of the content based on information indicating an acquisition destination of the location information, and acquiring the content based on the acquired location information when the auxiliary information is received in advance of the reception of the content and the auxiliary information includes the information indicating the acquisition destination of the location information.

In the playback step, the content may be played back while the synchronization is achieved through synchronization of the reference clock of the content transmitted using the communication channel with the reference clock of the content transmitted using the broadcast wave based on the difference information when the auxiliary information including difference information between a reference clock of the content transmitted using the broadcast wave and a reference clock of the content transmitted using the communication channel is received in the reception step and the reference clock of the content transmitted using the broadcast wave differs from the reference clock of the content transmitted using the communication channel.

The transmission device according to still another aspect of the present disclosure that can transmit the content using the broadcast wave and the communication channel, the transmission device includes the information transmitter that transmits auxiliary information using at least the broadcast wave, the auxiliary information for synchronizing the content transmitted using the broadcast wave and the content transmitted using the communication channel when the content is transmitted using the broadcast wave and the communication channel, the auxiliary information causing the reception side to synchronize the content transmitted using the broadcast wave and the content transmitted using the communication channel when the reception side receives the auxiliary information.

The reception device according to yet another aspect of the present disclosure includes: the reception part that receives the content transmitted using the broadcast wave and the content transmitted using the communication channel; and the playback part that plays back the content transmitted using the broadcast wave and the content transmitted using the communication channel while synchronizing the pieces of content, when the auxiliary information for synchronizing the content transmitted using the broadcast wave and the content transmitted using the communication channel is received.

As described above, in the first exemplary embodiment, the identification information indicating whether the content including the audio and the video is to be transmitted by the combination of the broadcasting and the communication and, when the broadcasting and communication are used in combination, the information indicating the dependence relationship between the pieces of data transmitted through the transmission channels of the broadcasting and communication may be generated and transmitted as the content management information. For example, the information indicating the dependence relationship between the pieces of data may include whether the pieces of data transmitted through both the transmission channels are to be synchronously played back. The information indicating the dependence relationship between the pieces of data may include whether the pieces of clock information on the pieces of data transmitted through both the transmission channels are identical to each other.

Thus, the transmission channel through which the content including the audio and the video and the dependence relationship between the pieces of data transmitted through the different transmission channels are acquired in starting the reception of the content, so that the delay time relevant to the decision of the asset to be received or the acquisition start of the communication content can be reduced.

In the first exemplary embodiment, the location information on the data transmitted through the communication may be included in the content management information. For example, the location information on the transmitted data may be the MPD in the MPEG-DASH. Not the data entity of the location information on the MPD but the information indicating the acquisition destination of the location information may be stored in the content management information.

Thus, the transmission channel through which the content including the audio and the video and the dependence relationship between the pieces of data transmitted through the different transmission channels are acquired in starting the reception of the content, so that the delay time relevant to the decision of the asset to be received or the acquisition start of the communication content can be reduced.

In the first exemplary embodiment, the reception device may analyze the content management information, and decide the transmission channel through which the content is received and the data received through each transmission channel. For example, in the case that the pieces of clock information on the pieces of data transmitted through the transmission channels are different from each other, auxiliary information necessary for the clock synchronization between the pieces of data is acquired, and the DTSs or PTSs of the pieces of data may be decoded and played back while synchronized with each other. In the case that the pieces of data transmitted through the transmission channels are to be synchronously played back, the auxiliary information necessary for the clock synchronization between the pieces of data is acquired, and the DTSs or PTSs of the pieces of data may be decoded and played back while synchronized with each other.

Thus, the reception device that receives only the broadcasting data can meet the playback of the communication data while being able to play back the broadcasting data by the operation similar to that of the reception of the conventional broadcasting.

A mechanism that synchronously plays back the broadcasting data and the communication data can be provided to the reception device.

Even if the clocks of the pieces of data transmitted through the plurality of transmission channels are not synchronized with each other, the clocks can be synchronized with each other by acquiring the auxiliary information necessary for the clock synchronization, and the pieces of data can synchronously be played back.

Second Exemplary Embodiment

In transmitting the information whether the stream transmitted through the broadcasting and the stream transmitted through the communication are the synchronization playback target or the information indicating the dependence relationship between the streams transmitted through the transmission channels, the transmission method and the reception method for receiving the pieces of information are described in the first exemplary embodiment.

Desirably playback control is performed in the application in the case that the reception device flexibly plays back the content while user operation is involved as in the case that the user selects the playback target from the selectable audio and video or a single-view full screen display is switched to multiview display in a video screen.

Mainstream applications are based on a widely-spread HTML (Hyper Text Markup Language) browser. In the case that the application is the HTML, the playback control can be performed by interpreting the HTML. HTML has an advantage of selecting or switching the content and of flexibly describing a layout change.

For example, in the hybridcast defined by the IPTV forum, the identification information, such as ait_identifier_info( ), which indicates the existence of the application, is transmitted in the data that is always referred to in starting the reception of the broadcasting program such as the descriptor of the PMT in the TS and the descriptor of the MPT in the MMT. In the reception device compatible with the hybridcast, in the case that the identification information exists, application control information such as the AIT is acquired from the section or data carousel in the TS or the information corresponding to the MMT message or data carousel or by the download through the communication network. Then, the application such as the HTML file is acquired based on the application control information.

Hereinafter, application control information or the data of the application is referred to as application-related data. The application may be described using description languages such as an XML other than the HTML.

[Method for Transmitting Default Service Information]

In the case that the receiver that is not compatible with the application exists, or even if the receiver is compatible with the application, a time lag from the tuning start in the broadcasting or communication is generated until the application is started since the application is acquired.

Accordingly, default setting information on the stream to be played back or the display layout may be transmitted in not the application-related data but the data, such as the PMT and the MPT, which is always acquired during the tuning, or the data, such as another TS section and the MMT message, which can be acquired with a delay shorter than a time necessary for the start of the application. The information used for performing the advanced playback control may be transmitted as the application data of the HTML.

Examples of the information relevant to the playback control of the stream transmitted through the broadcasting or communication include (a) information on the scalability between the streams, (b) information on switching of streams such as multilingual voices or videos having different bit rates, (c) simultaneous display information such as information indicating the plurality of video streams that can simultaneously be displayed, and information on the layout during the simultaneous display. Default values of these pieces of information are referred to as default playback control information.

In the reception device that is not compatible with the application, the playback is performed based on the default value. On the other hand, the reception device compatible with the application starts the playback based on the default value, and switches the playback operation after the start of the application based on the user operation or a control command of the application.

The playback operation may be switched by the application only for the information that can be switched by the user operation. For example, the simultaneous display can basically be switched by the user. For the time scalability, the receiver may automatically decide the playback operation such that the extension layer is always used when the stream of the extension layer can be acquired. In this case, the information on the time scalability is transmitted only in the default playback control information.

In the TS, the information on the playback control is basically performed by the application, and the information on the scalability may be transmitted in the default playback control information. At this point, only the information correlating the stream of the basic layer and the stream of the extension layer may be transmitted by the default playback control information or the descriptor defined by the MPEG-2 TS, and the application side may decide whether the extension layer is to be decoded based on the control command of the application or the user operation.

The playback operation may be switched by the application only for the information relevant to the layout. For example, the time scalability or the stream switching does not involve the layout change. Accordingly, these pieces of information are transmitted only in the default playback control information. On the other hand, in the information on the simultaneous display, the playback operation can be performed by the application because the switching is possibly performed by the user operation.

(Description Example of Default Playback Control Information)

A description example of the playback control information in switching the playback operation of the default playback control information using the application will be described below. It is assumed that the default playback control information is stored in the descriptor, and that the application control information is described in the HTML.

FIG. 18A is a view illustrating a description example of the default playback control information of the second exemplary embodiment, and FIG. 18B is a view illustrating a video display example according to the layout information of the default playback control information in FIG. 18A. In the default playback control information of FIG. 18A, the full screen display of the video of PID=100 is indicated by the layout information as illustrated in FIG. 18B.

In the layout information, only the full screen display may be indicated without indication of information specifying the stream. At this point, in the case that at least two video streams exist, the full screen display of the video played back in default can be performed when information (application control information) specifying the video to be played back in default is separately indicated.

FIG. 19A is a view illustrating an example of the application control information of the second exemplary embodiment, and FIG. 19B is a view illustrating a video display example according to the layout information of the application control information in FIG. 19A.

In the application control information of FIG. 19A, two display areas of area 1 and area 2 are set by a Layout tag. As illustrated in FIG. 19B, the video of PID=100 is displayed in area 1, and the video of PID=200 is displayed in area 2.

Accordingly, the reception device that receives the HTML application control information in FIG. 19A displays the video of PID=100 and the video of PID=200 in area 1 and area 2, respectively. The information specifying the video may be the URL or the packet ID of the MMT packet in addition to the PID.

Thus, in the example of FIGS. 19A and 19B, the default playback control information indicates the two kinds of information, namely, the scalability and the layout. The scalability indicates that the kind of the scalability is the time scalability, the video of PID=100 is the basic layer, and the video of ID=200 is the extension layer. The layout information indicates the full screen display of the video of PID=100.

Assuming that the frame rate of 60 fps only in the basic layer increases to 120 fps using the extension layer, only the video of PID=100 is decoded and the video image corresponding to 60 fps is played back by the full screen display in the default state. In the case that stream attribute information such as the stream type of the MPEG-2 system separately indicates the transmitted stream corresponds to the basic layer or extension layer of the scalability, these pieces of information does not need to be described in the default playback control information. When only the basic layer is to be decoded and played back in the default state is separately defined, the layout information may only indicate the full screen display.

FIG. 20A is a view illustrating another description example of the default playback control information of the second exemplary embodiment, and FIG. 20B is a view illustrating a video display example according to the layout information of the default playback control information in FIG. 20A. FIG. 21A is a view illustrating an example of the application control information of the second exemplary embodiment, and FIG. 21B is a view illustrating a video display example according to the layout information of the application control information in FIG. 21A.

In FIG. 21A, function A is defined by a Script tag. Function A is a function of issuing an instruction to decode and play back the extension layer of the time scalability when a button on the screen is pressed, and the index number specifying the basic layer and the extension layer is indicated as an argument. A Body tag describes that function A is called in the case that a specific button of a remote controller is pressed.

When the button is pressed, the reception device that receives the HTML application in FIG. 21A decodes the stream of the extension layer of PID=200, and plays back the video image corresponding to 120 fps by the full screen display.

The audio or video stream played back in default may separately be indicated using the MPEG-2 system or the MMT descriptor. For example, the streams played back in default can be grouped, and a group ID and the stream can be correlated with each other. Alternatively, the descriptor indicating the stream played back in default may be defined, and a list of PIDs of the streams played back in default can be included in the descriptor.

A default value may be previously defined in the default playback control information to eliminate the need of transmission of the default playback control information in the case that a parameter value is equal to the default value. For example, when the full screen display is set to the default value as the layout, the layout information does not need to be included for the full screen display. At this point, in the case that the full screen display is not compatible with the stream switch while the scalability is not used, the default playback control information does not need to be transmitted.

[Reception Method]

In the second exemplary embodiment, the reception side acquires the service information, and subsequently analyzes the default playback control information and the playback control information provided by the application, and is operated. A reception method of the second exemplary embodiment will be described below with reference to the drawings.

Figure 22:
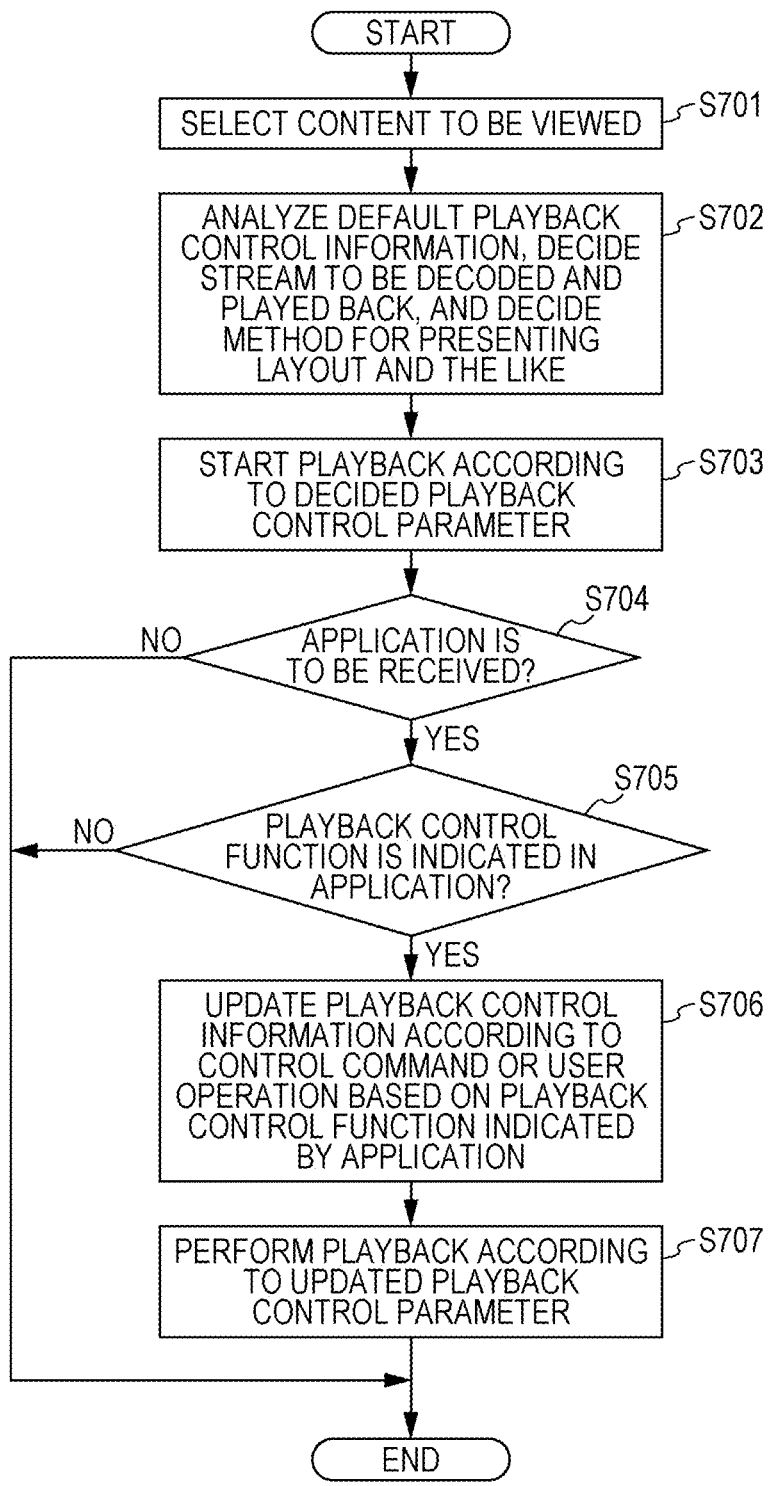
FIG. 22 is a flowchart illustrating an operation example on a reception side of the second exemplary embodiment.

FIG. 22 is a flowchart illustrating an operation example on the reception side of the second exemplary embodiment. FIG. 22 illustrates an example of the operation to decide the layout in the case that the default playback control information and the playback control information provided by the application are analyzed to present the scalability, the stream switching function, and the content.

In Step S701, the reception side selects content to be viewed.

In Step S702, the reception side analyzes the default playback control information, decides the stream to be decoded and played back, and decides the layout presentation method.

The default playback control information may be transmitted while included in the PMT or MPT data that is always acquired during the tuning, or the default playback control information may be transmitted by the MPEG-2 TS section or MMT message that is transmitted separately from the application-related data.

In the case that the default playback control information is to be transmitted by the section or message, the default value of the default playback control information is set, and the operation may be performed based on the default value of the default playback control information until the section or the message is received. The stream to be decoded and played back may be decided by referring to the descriptor indicating the audio or video stream played back in default.

In Step S703, the playback is started according to the decided playback control parameter.

In Step S704, whether the application is to be received is determined. The processing is ended when the application is not to be received (NO in S704). On the other hand, when the application is to be received (YES in S704), the flow goes to Step S705, and whether the playback control function is indicated in the application is determined.

When the playback control function is not indicated (NO in S705), the processing is ended. When the playback control function is indicated (YES in S705), the flow goes to Step S706, and the playback control information is updated in response to the control command or the user operation based on the playback control function indicated by the application.

In Step S707, the playback is performed according to the updated playback control parameter, and the processing is ended.

[Reception Device]

Figure 23:
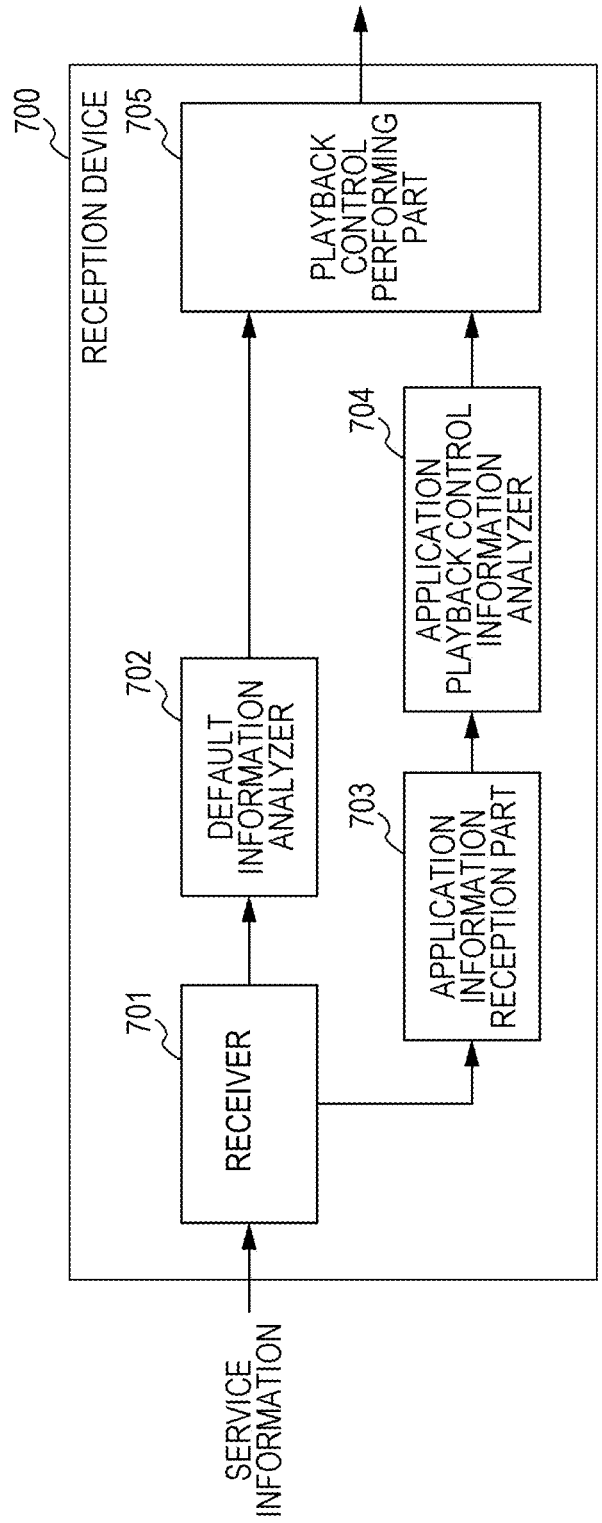
FIG. 23 is a block diagram illustrating a configuration example of a reception device of the second exemplary embodiment.

FIG. 23 is a block diagram illustrating a configuration example of a reception device of the second exemplary embodiment. FIG. 23 illustrates the configuration example of the reception device that performs the operation in each step of FIG. 22.

Reception device 700 in FIG. 23 includes receiver 701, default information analyzer 702, application information reception part 703, application playback control information analyzer 704, and playback control performing part 705. Because the operations of these parts are similar to those in the steps of FIG. 22, the description is omitted.

(First Modification)

The mechanism that updates the default playback control information using the application can be applied to the single broadcasting, the single communication, the transmission of the content by the combination of the broadcasting and the communication.

The technical thought of the second exemplary embodiment can also be applied to the MPEG-2 TS timeline extension (13818-3: 2013/AMD6) that is currently standardized in the MPEG. In the TS timeline extension, in transmitting the content using the plurality of multiplexing streams including at least one TS (referred to as a basic TS), information synchronizing the basic TS with the reference clock used in the decoding or display of the content in other multiplexing streams is provided.

Specifically, a timeline extending access unit including information correlating the reference clock of the multiplexing stream different from the basic TS with the PCR of the basic TS is defined, and the timeline extending access unit is stored in a PES packet, and transmitted in the form of TS packet. In the timeline extending access unit, the timeline extending information is expressed in the format of the descriptor of the MPEG-2 system. The timeline extending information is transmitted in a PES packet unit. Therefore, the reference clock synchronization with the updated PCR can rapidly be performed even if the PCR is discontinuously generated.

However, because generally the discontinuous PCR is not generated in the broadcasting program, the timeline extending information is received in starting the reception of the broadcasting program, and the reference clocks are synchronized with each other. Therefore, the necessity of re-synchronization is frequently eliminated in the broadcasting program.

Accordingly, in the case that it is guaranteed that the discontinuous PCR is not generated in the broadcasting program, the default value of the timeline extending information is stored in the PMT, but the timeline extending access unit does not need to be transmitted. For example, in the timeline extending access unit, the descriptor similar to the descriptor in which the timeline extending information is stored can be stored in the PMT section, and used as the default value of the timeline extending information. Both the timeline extending access unit and the default information stored in the PMT may be used.

In the case that it is guaranteed that the discontinuous PCR is not generated in the broadcasting program or until a specific clock time while the timeline extending access unit is transmitted, after the clock synchronization is performed based on the information on the timeline extending access unit received immediately after the tuning, the re-synchronization does not need to be performed in the broadcasting program or until the specific clock time.

In the case that the timeline extending information is transmitted by the section, the timeline extending information corresponding to the updated PCR may be transmitted for a given period since the generation of the discontinuous PCR. In the reception device, when the version number of the section is updated, the re-synchronization is performed based on the timeline extending information included in the section. The clock synchronization between the streams cannot be guaranteed at the clock time after the generation of the discontinuous PCR and before the re-synchronization. At this point, the discontinuity of the PCR is separately detected based on information, such as a TS discontinuity indicator, which indicates the discontinuity of the PCR. When the discontinuity of the PCR is detected, the decoding and display are performed until the re-synchronization on the assumption that the basic TS and the access unit of the media being the synchronization target are set to a fixed frame rate.

[Effect of Second Exemplary Embodiment and the Like]

As described above, in the second exemplary embodiment, when the layout information on the video display or the playback control information including the information indicating the stream that is switchable during the playback is transmitted in the content including the audio or video, the default value of the playback control information is stored in the data that is always received during the tuning, and the information used for updating the default playback control operation is transmitted while stored in the information relevant to the application such as the hybridcast.

In the case that the playback is started according to the default value of the playback control while the reception device is compatible with the application, the default playback control information is updated in response to the user operation based on the playback control function transmitted as the application data.

Thus, the delay time necessary for the decision of the parameter relevant to the playback control of the content layout content can be reduced.

Third Exemplary Embodiment

As described above, in the MMT system, the video and audio are multiplexed and packetized, and transmitted through at least one transmission channel such as the broadcasting and the communication. The reception device can receive the packet transmitted through at least one transmission channel, extract the desired packet from the packets that are received based on the program information, and perform the decoding and the presentation.

That is, in the MMT system, the media (such as the video image, voice, and the subtitle) transmitted through the plurality of transmission channels can be received to configure the program. However, the program cannot be configured using both the data accumulated by the download through the broadcasting or communication and the data streamed through the broadcasting or communication.

Therefore, a transmission method and a reception method in the case that the program is configured using both the data accumulated by the download through the broadcasting or communication and the data streamed through the broadcasting or communication will be described in a third exemplary embodiment.

The MMT (MPEG Media Transport) standardized by MPEG will be described below as an example of the broadcasting-side multiplexing format in the broadcasting and communication cooperation service.

In the MMT, the program information is transmitted by the table such as the MPT (MMT Package Table) or message information such as the PA (Package Access) message. The asset (the single medium such as the audio and the video) constituting the program or the location information transmitting the asset are described in the MPT. One asset can also be transmitted through the plurality of transmission channels.

In the third exemplary embodiment, the transmission side also transmits the content (data or asset) using the broadcast wave and the communication channel, and transmits the service information in advance of the content transmission.

[Service Information]

FIG. 24 is a view illustrating an example of the data structure of the service information in the broadcasting and communication cooperation service of the third exemplary embodiment. FIG. 25 is a view illustrating an example of information included in a program configuration information descriptor of the third exemplary embodiment.

As illustrated in FIG. 24, the program configuration information descriptor is included in the MPT, and the program configuration information descriptor indicates the information on the asset constituting the package. The information on the asset constituting the package can includes the following items.

(Information on Asset)

1) Information indicating whether the asset constituting the program includes an accumulated asset (hereinafter, referred to as an accumulative asset) may be included in the program configuration information descriptor as the information on the asset. As used herein, the accumulated asset means the asset that is accumulated in, for example, a memory such as an HDD or an internal memory, an SSD, and an SD card or a Blu-ray disc.

2) In the case that the asset constituting the program includes the accumulative asset, information indicating the program configuration may be included in the program configuration information descriptor as the information on the asset.

For example, information indicating the program configuration may be included. Examples of such information is information indicating that the program is constructed only with the accumulative asset, information indicating that the program is constructed with the accumulative asset and the transmitted asset (hereinafter, referred to as a transmission asset), or information indicating that the program is constructed with the asset including the accumulative packet and the transmission asset. For example, in the case that the program is constructed with the scalably-coded video image, information indicating that the transmission asset includes the basic layer while the accumulative asset includes the extension layer may be included. Information indicating whether the decoding or the playback of the accumulative asset is required for the playback of the program may be included. For example, in the case that the content of the accumulative asset is additional information, the playback can be deemed to be not necessary, and information indicating that the playback of the accumulative asset is not necessary may be included.

For example, in the case that the reception device is not compatible with the accumulation, or in the case that the accumulative asset is not accumulated, the program can be played back using the asset acquired through the broadcasting or communication with no use of the accumulative asset based on the information indicating that the decoding or the playback of the accumulative asset is not necessary for the playback of the program.

3) The information on the accumulative asset may be included in the program configuration information descriptor as the information on the asset.

For example, a) the attribute information such as accumulation format of the accumulative asset, the video or voice coding system, the transmission system in which the accumulative asset is transmitted, and the multiplexing system may be included. In this case, the attribute information is previously provided to the accumulative asset, and the attribute information may be included in the header of the accumulative asset or the program information indicating the configuration of the accumulative asset. The reception device can perform the playback when the attribute information stored in the program information is matched with the attribute information on accumulative asset. For example, b) information on capability and function of the receiver which are necessary for the playback of the program including the accumulative asset may be included. For example, c) information (scramble system, viewing limit, conditional access, and copyright information) restricting the playback or viewing of the program or a key may be included. In this case, the reception device may check the viewing restriction information stored in the program information against the accumulative asset to determine whether the accumulative asset can be played back or viewed. The reception device may accumulate the previously-encrypted asset, and decode the encryption of the accumulative asset based on the transmitted key.

4) In the case that the asset constituting the program is constructed with the transmission asset and the accumulative asset, the clock time information used for synchronizing and playing back the transmission asset and the accumulative asset may be included in the program configuration information descriptor as the information on the asset.

For example, the clock time information may indicate an offset amount of the reference clock time information on the transmission asset to the reference clock time serving as the reference of the time stamp provided to the accumulative asset. In the case that the time stamp is provided to the accumulative asset based on the PCR (Program Clock Reference) or the NTP (Network Time Protocol), the relative clock time relative to the transmitted reference clock time (PCR or NTP) may be indicated. In the case that the accumulative asset is accumulated in a format having a random access table, the clock time information may be a clock time information table of the transmission asset relative to a random access point of the accumulative asset.

(Location Information)

In the MPT, the location information on the asset is described in each asset. For example, in the case that one asset exists in the plurality of locations, the plurality of pieces of location information are described in the MPT.

FIG. 26 is a view illustrating an example of information included in the location information descriptor of the third exemplary embodiment. FIG. 27 is a view illustrating an example of a location type included in the location information descriptor of the third exemplary embodiment.

As illustrated in FIG. 26, in the location information descriptor, a location type and an identifier specifying the asset corresponding to the location type are described as the location information.

The location type expresses location information. In an example of FIG. 26, because the location type has a value Value of 0xA0 (Value=0xA0), the data is accumulated in Local as illustrated in FIG. 27. In the case that the location type indicates that the data is accumulated in Local, a local ID uniquely indicating the accumulated data is described in the location information.

For example, the local ID may be the asset ID of the accumulated asset or the packet ID. The local ID may be a 32-bit transport file identifier defined in ARIB STD-B45, or newly defined. Various IDs such as a network ID and a stream ID may be combined to generate the local ID according to a predetermined naming rule. A broadcasting station, a transmission station, a content provider, and the like may previously provide the local ID, or the receiver side may add corrected or additional information to the ID. The reception side may provide the original ID so that the data can be specified by preparing a table indicating a correlation with the ID provided on the transmission side.

The above example indicates that the asset is accumulated in Local using the location type, and the local ID is separately provided. Alternatively, the following method may be adopted. For example, data may be specified by selecting IPv4 as the location type, and using an IP address unique to Local. For example, in the case that the IP address is 192.168.xxx.xxx, the asset may be deemed to be accumulated in Local, and the asset accumulated in the portion of xxx.xxx may be specified.

The local ID is provided to the data (file) of the accumulative asset. For example, the local ID is stored in the file header of the file. The local ID may previously be stored in the broadcasting station, transmission station, or the content provider, or stored on the reception side.

The above descriptor is described by way of example. Alternatively, the descriptor may be constructed with the data structure having the similar function. The descriptor and identifier of the third exemplary embodiment may be stored in the table or message indicating information in the package unit different from the MPT. The transmission may be performed using another piece of signaling information.

Although the MMT is described by way of example, the format is not limited to the MMT. Alternatively, other format such as the TS and the MPEG-DASH may be used. For example, in the case that the MPEG2-TS is used as the multiplexing system, the descriptor may be stored in the PMT (Program Map Table). In the case that the data is transmitted by the combination of the MPEG2-TS system and another system, the descriptor may be stored in the TEMI (Timeline and External Media Information) access unit. In the case that the MPEG-DASH is used, the description may be made in MPD (Media Presentation Description).

(Asset Configuration Information Descriptor)

In the MMT system, one asset can be transmitted through the plurality of transmission channels. At this point, an asset configuration information descriptor indicating an asset configuration may be stored.

FIG. 28 is a view illustrating an example of information included in the asset configuration information descriptor of the third exemplary embodiment. The information indicating the asset configuration can include the following items.

1) Information indicating that the asset is the accumulative asset or information indicating that the asset includes the accumulative packet may be included in the information indicating the asset configuration. As used herein, the case that the asset includes the accumulative packet means the case that one asset is constructed with the packet transmitted through the broadcasting or communication and the accumulated packet.

2) In the case that the asset is the accumulative asset, for example, a) the information indicating that the asset is constructed only with the accumulative asset and the information indicating that the asset is constructed with the accumulative packet and the transmission packet may be included as the information indicating the asset configuration. b) In the case that the asset is constructed with the scalably-coded video image, for example, information indicating that the transmission packet includes the basic layer while the accumulative packet includes the extension layer may be included as the information indicating the asset configuration. c) Information indicating whether the decoding and playback of the accumulative packet are required for the asset configuration may be included as the information indicating the asset configuration. For example, in the case that the content of the accumulative packet is additional information, the playback can be deemed to be not necessary, and information indicating that the playback of the accumulative packet is not necessary can be indicated.

Thus, in the case that the reception device is not compatible with the accumulation, or in the case that there is no accumulative packet, the program can be played back using the packet acquired through the broadcasting or communication with no use of the accumulative packet based on the information indicating that the decoding or the playback of the accumulative packet is not necessary for the playback of the asset.

The asset configuration information descriptor is described by way of example. Alternatively, the asset configuration information descriptor may be configured by the data structure having the similar function.

The asset configuration information descriptor and the identifier may be stored in the table or message indicating information in the package unit different from the MPT. The transmission may be performed using another piece of signaling information.

Although the MMT is described by way of example, the format is not limited to the MMT. Alternatively, other format such as the TS and the MPEG-DASH may be used. For example, in the case that the MPEG2-TS is used as the multiplexing system, the descriptor may be stored in the PMT (Program Map Table). In the case that the data is transmitted by the combination of the MPEG2-TS system and another system, the descriptor may be stored in the TEMI (Timeline and External Media Information) access unit. In the case that the MPEG-DASH is used, the description may be made in MPD (Media Presentation Description).

[Reception Method and Reception Device]

An example of the operation in which the reception device of the third exemplary embodiment synchronously plays back the accumulative asset will be described below with reference to the drawings.

Figure 29:
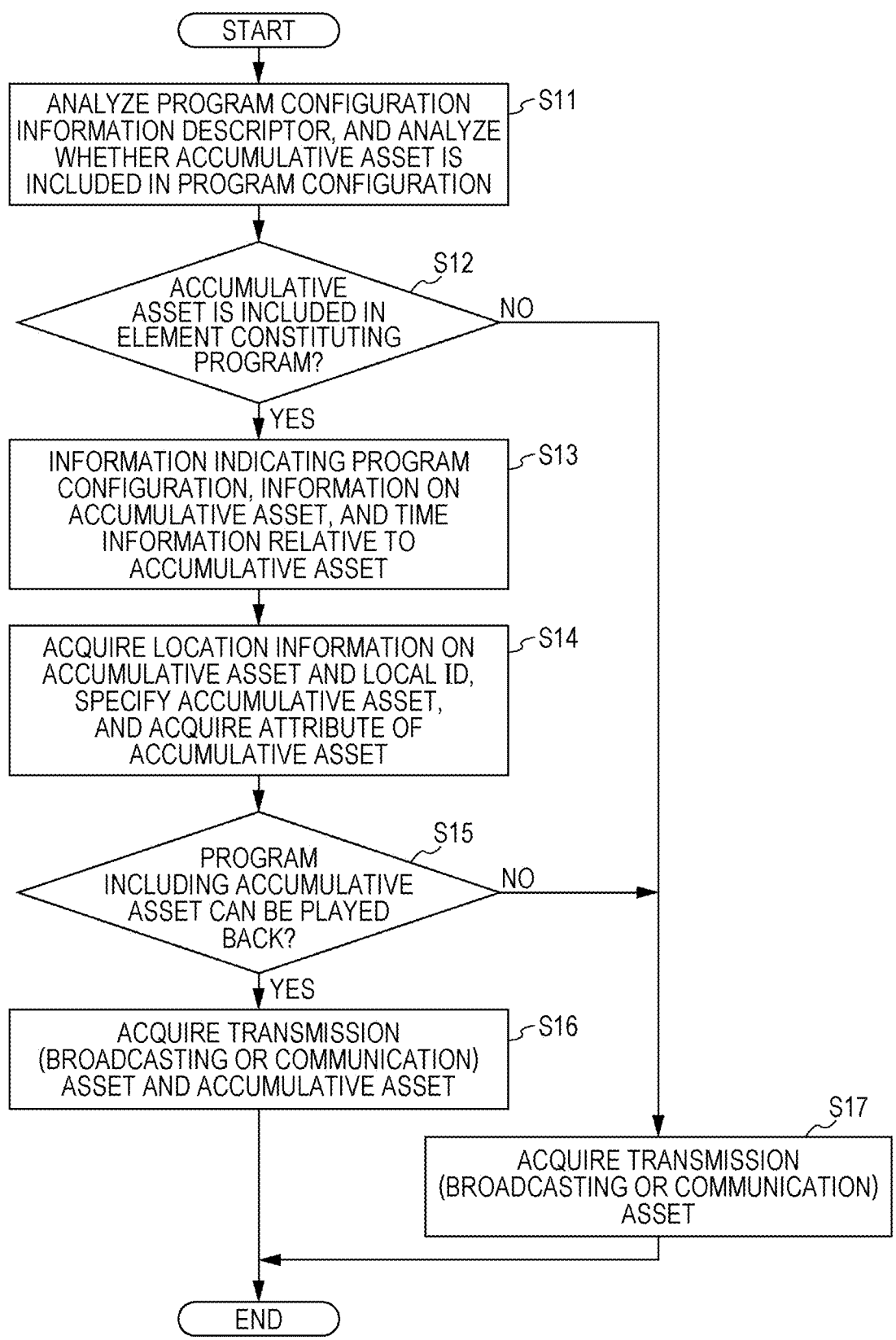
FIG. 29 is a flowchart illustrating a reception method in the broadcasting and communication cooperation service of the third exemplary embodiment.
Figure 30:
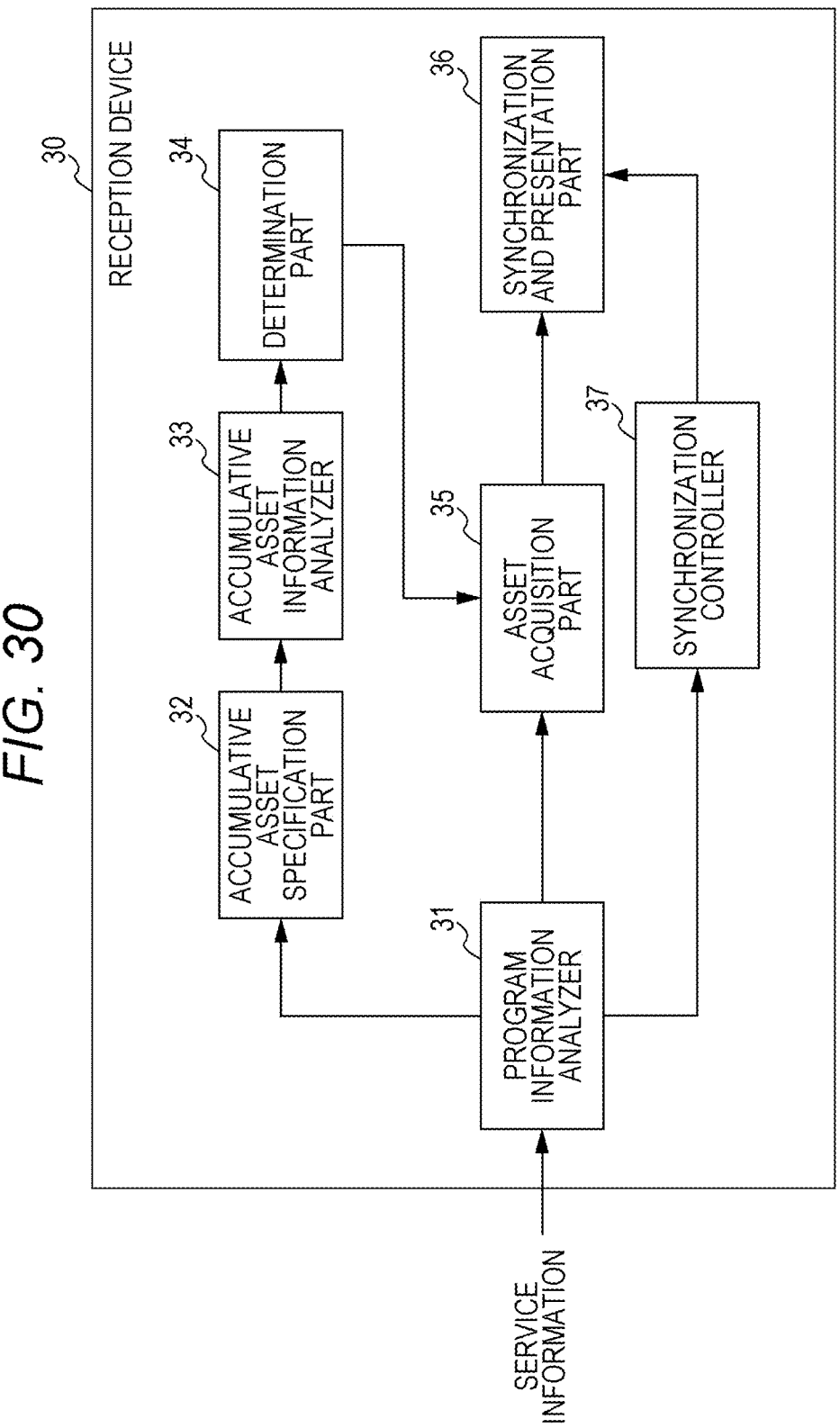
FIG. 30 is a block diagram illustrating a configuration example of a reception device of the third exemplary embodiment.

FIG. 29 is a flowchart illustrating a reception method in the broadcasting and communication cooperation service of the third exemplary embodiment. FIG. 30 is a block diagram illustrating a configuration example of a reception device of the third exemplary embodiment.

Reception device 30 in FIG. 30 includes program information analyzer 31, accumulative asset specification part 32, accumulative asset information analyzer 33, determination part 34, asset acquisition part 35, synchronization and presentation part 36, and synchronization controller 37.

In Step S11, program information analyzer 31 analyzes the program configuration information descriptor constituting the entry point, and analyzes whether the accumulative asset is included in the program configuration.

In Step S12, program information analyzer 31 determines whether the accumulative asset is included in the element constituting the program. When the accumulative asset is included in the element constituting the program (YES in S12), the flow goes to Step S13 to acquire the information indicating the program configuration, the information on the accumulative asset, and the relative clock time information relative to the accumulative asset. When the accumulative asset is not included (NO in S12), the flow goes to Step S17, the transmission asset transmitted through the broadcasting or communication is acquired, and synchronously played back.

In Step S14, reception device 30 acquires the location information on the accumulative asset and the local ID. More specifically, in the case that the asset is locally accumulated, accumulative asset specification part 32 searches and specifies the asset corresponding to the local ID from the assets accumulated in reception device 30. In the case that the plurality of accumulation devices exist, the asset may be searched from the plurality of accumulation devices, or searched only from a specific accumulation device. Accumulative asset information analyzer 33 acquires the attribute information on the specified asset.

In Step S15, determination part 34 determines whether the program including the accumulative asset can be played back based on the accumulative asset information acquired in Step S12 and the accumulative asset attribute information acquired in Step S14.

When the program can be played back (YES in S15), the flow goes to Step S16, asset acquisition part 35 acquires the accumulative asset in addition to the transmission asset transmitted through broadcasting or communication. Based on the acquired relative clock time information, synchronization controller 37 performs synchronization control processing on the transmission asset and the accumulative asset, and synchronization and presentation part 36 synchronizes and presents the program.

On the other hand, when the program cannot be played back (NO in S15), the flow goes to Step S17, the transmission asset transmitted through the broadcasting or communication is acquired, and synchronously played back.

[Effect of Third Exemplary Embodiment and the Like]

As described above, the third exemplary embodiment can implement the program information generation method, the program playback method, and the playback device in multiplexing the broadcasting and communication cooperation service in the format such as the MMT (MPEG Media Transport) system currently standardized in the MPEG (Moving Picture Expert Group).

The MMT system multiplexes and packetizes the video and audio, and transmits the multiplexed and packetized video and audio through at least one transmission channel such as the broadcasting and the communication, and the reception device receives the packet transmitted through at least one transmission channel, extracts the desired packet from the packets that are received based on the program information, and performs the decoding and the presentation.

In the MMT system, the media (such as the video image, voice, and the subtitle) transmitted through the plurality of transmission channels can be received to configure the program. However, the program cannot be configured using both the data accumulated by the download through the broadcasting or communication and the data streamed through the broadcasting or communication.

In third exemplary embodiment, the identifier indicating that one of media constituting the program is the accumulated data and the identifier that can specify the accumulated medium (file) are provided in the program information indicating the program configuration. The playback device analyzes the program information, specifies the medium transmitted through the broadcasting and communication and the accumulated data, and synchronously plays back the media and the accumulated data.

Thus, the program is constructed using both the data accumulated by the download through the broadcasting or communication and the data streamed through the broadcasting or communication, so that the service cooperated with the accumulated file can be provided in addition to the conventional broadcasting and communication cooperation service.

In third exemplary embodiment, the combination of the transmission asset and the accumulative asset is described by way of example. Alternatively, the transmission asset may be the asset transmitted through the broadcasting or the asset transmitted through the communication. The transmission asset may be the asset transmitted though both the broadcasting and the communication. The following service may be provided as the service in which the accumulative asset is used. An identifier indicating the service content may be stored in the program information.

(Service in Which Accumulative Asset is Used)

1) The asset constituting the program may be previously downloaded, and only the program information or clock time synchronizing information (such as the clock time reference information or the relative value of the time stamp) may be transmitted through the broadcasting, and the program may be played back using the accumulative asset. At this point, the broadcaster can provide the program in which the accumulated data is used to viewers in real time along a broadcasting program schedule. The viewers can view the accumulated data as if the viewers view the broadcasting program that is broadcasted in real time. Not only the real-time broadcasting but also on-demand content can be provided.

2) The program information or the random access point may be previously downloaded and accumulated together with the asset constituting the program, and the program information or the random access point may construct the program while being synchronized with the program information transmitted through the broadcasting or communication.

3) The normal broadcasting program can be transmitted only through the broadcasting while the service cooperated with the accumulated data is provided only during a commercial message. The commercial message data may be previously downloaded through the broadcasting or communication to provide the program including the accumulated data to the viewers in a commercial message time slot. The plurality of pieces of commercial data may be previously downloaded to enable selection of the commercial message to be provided according to the attribute or preference of the viewer. The attribute or preference of the viewer may be acquired and analyzed by the reception device, or acquired in cooperation with another application or service.

4) The broadcaster may allocate an empty frequency resource to another service by providing the service cooperated with the accumulated data. At this point, information indicating that a frequency resource used in the service is being provided to another service may be stored in the program information.

5) A function in which the viewer switches the program to the program cooperated with the accumulative asset may be included. For example, the viewer who views only the transmission asset may switch to the program including the accumulative asset using an user interface such as a remote controller.

6) The reception device or the viewer may set whether to gain the access to the accumulative asset to construct the program. The access to the accumulative asset to construct the program may be enabled only in the case that the program information is guaranteed to be reliable. A key or the like may be stored in information indicating that the program information is reliable.

(EPG)

7) The information displayed as EPG (Electronic Program Guide) may be acquired from the program information or the signaling information dedicated to the EPG.

8) Information indicating whether the program is to be provided through the broadcasting, through the communication, using the accumulation, by the combination of the broadcasting and the communication, or as the extension service may be displayed on the EPG. Only the function that can be provided by the reception device may be displayed. For example, in the case that the reception device does not have the accumulation function or the communication reception function, information on the accumulation or the communication does not need to be displayed.

9) In the case of the program including the accumulative asset, information indicating whether the accumulative asset of the program is accumulated may be displayed on the EPG. Information indicating whether the accumulative asset of the program can be provided may be displayed on the EPG. The information may be indicated by a character or a background color of the program of the EPG. The content including the accumulative asset may present information on the viewing limit or the copyright.

10) In the case that the program including the accumulative asset is reserved from the EPG, information indicating whether the accumulative asset can be downloaded through the broadcasting, can be downloaded through the communication, or can be viewed by the communication streaming may be displayed on the EPG. In the case that the reception device does not include the communication means, only the information indicating whether the accumulative asset can be downloaded through the broadcasting may be displayed. The viewer selects any method that can achieve the timer download and reserves the program.

The timer download may previously be set from the EPG by the viewer, or the reception device may automatically perform the download. The viewer may select the download method, or the reception device may automatically select the download method.

The display of the EPG or the function of the reception device may be changed according to time slot in which the download can be performed through the broadcasting, the time slot in which the download can be performed through the communication, and the time slot in which the download can be performed by the communication streaming.

The presentation method is not limited to the EPG display mentioned above, but may be another method other than the EPG.

Although the transmission method and reception method of the exemplary embodiments of the present disclosure are described above, the present disclosure is not limited to the exemplary embodiments. Various modifications of the exemplary embodiments conceived by those skilled in the art and the combinations of the components of the different exemplary embodiments may also be included in the present disclosure as long as the modifications and combinations do not depart from the present disclosure.

For example, in the exemplary embodiments, each component may be constructed with dedicated hardware, or implemented by executing a software program suitable for the component. Each component may be implemented such that a program execution part such as a CPU and a processor reads and executes the software program recorded in a hard disk or a recording medium such as a semiconductor memory.

The present disclosure is useful for the content transmission and reception methods for enabling transmission of content using the broadcast wave and the communication channel.

What is claimed is:

1. A transmission method for enabling transmission of content using a broadcast wave and a communication channel, the transmission method comprising:
    generating a first content data and a second content data;
    transmitting auxiliary information using at least the broadcast wave or the communication channel, the auxiliary information being information for synchronizing the first content data and the second content data;
    hybrid-transmitting the first content data and the second content data, the first content data being transmitted using the broadcast wave and the second content data being transmitted using the communication channel so that the first content data and the second content data constitute the content, and when the content is hybrid-transmitted using the broadcast wave and the communication channel, the auxiliary information causing a reception side to perform the synchronization when the reception side receives the auxiliary information;
    wherein, in the transmitting of the auxiliary information, the auxiliary information includes attribute information indicating that the first content data and the second content data constitute the content and location information that indicates an acquisition destination of the content or information indicating an acquisition destination of the location information,
    the first content data and the second content data are (i) identical video and audio data each indicating the content, or (ii) video data, audio data, or video and audio data that constitute the content, and
    the auxiliary information also includes information indicating a format of meta-information on playback control of the content transmitted using the communication channel, the meta-information on the playback control including information on scalability between streams.

2. The transmission method according to claim 1, wherein the transmitting of the auxiliary information includes transmitting the auxiliary information before hybrid-transmitting the content.

3. The transmission method according to claim 1, wherein, in the generating of the first and second content data constituting the content, the content is generated while the auxiliary information is included in message information that is information relating to the acquisition of the content.

4. A reception method comprising:
    receiving content hybrid-transmitted as first content data transmitted using a broadcast wave and a second content data transmitted using a communication channel; and
    playing back the content transmitted using the broadcast wave and the content transmitted using the communication channel by synchronizing the first content data transmitted using the broadcast wave and the second content data transmitted using the communication channel so that the first content data and the second content data constitute the content, when auxiliary information for synchronizing the content transmitted using the broadcast wave and the content transmitted using the communication channel is received,
    wherein, in the playback of the content,
    the content is played back while the synchronization is performed, when the auxiliary information including attribute information indicating that the first content data and the second content data constitute the content and location information that indicates an acquisition destination of the content or information indicating an acquisition destination of the location information is received in the receiving step,
    the first content data and the second content data are (i) identical data each indicating the content, or (ii) video data, audio data, or video and audio data that constitute the content, and
    the auxiliary information also includes information indicating a format of meta-information on playback control of the content transmitted using the communication channel, the meta-information on the playback control including information on scalability between streams.

5. The reception method according to claim 4, wherein the receiving of the content includes receiving the auxiliary information before receiving the content, and the content is received by acquiring the content based on the location information.

6. The reception method according to claim 4, wherein the receiving of the content includes receiving the auxiliary information before receiving the content, and the content is received by acquiring the location information based on information indicating the acquisition destination, and acquiring the content based on the acquired location information when the auxiliary information includes the information indicating the acquisition destination of the location information.

7. A transmission device that can transmit content using a broadcast wave and a communication channel, the transmission device comprising:
    a transmitter that generates a first content data and a second content data, transmits auxiliary information using at least the broadcast wave or the communication channel, the auxiliary information being information for synchronizing the first content data and the second content, and hybrid-transmitting the first content data using the broadcast wave and the second content data using the communication channel so that the first content data and the second content data constitute the content, and when the content is hybrid-transmitted using the broadcast wave and the communication channel, the auxiliary information causing a reception side to perform the synchronization when the reception side receives the auxiliary information, wherein, in the transmitting of the auxiliary information by the transmitter, the auxiliary information includes attribute information indicating that the first content data and the second content data constitute the content and location information that indicates an acquisition destination of the content or information indicating an acquisition destination of the location information, the first content data and the second content data are (i) identical data each indicating the content, or (ii) video data, audio data, or video and audio data that constitute the content, and the auxiliary information also includes information indicating a format of meta-information on playback control of the content transmitted using the communication channel, the meta-information on the playback control including information on scalability between streams.

8. A reception device comprising:

a receiver that receives content hybrid-transmitted as a first content data transmitted using a broadcast wave and a second content data transmitted using a communication channel; and a player that plays back the content transmitted using the broadcast wave and the content transmitted using the communication channel by synchronizing the first content data transmitted using the broadcast wave and the second content data transmitted using the communication channel so that the first content data and the second content data constitute the content, when auxiliary information for synchronizing the content transmitted using the broadcast wave and the content transmitted using the communication channel is received, wherein, in the playback by the player, the content is played back while the synchronization is performed, when the auxiliary information including attribute information indicating that the first content data and the second content data constitute the content and location information that indicates an acquisition destination of the content or information indicating an acquisition destination of the location information is received in the receiving step, the first content data and the second content data are (i) identical data each indicating the content, or (ii) video data, audio data, or video and audio data that constitute the content, and the auxiliary information also includes information indicating a format of meta-information on playback control of the content transmitted using the communication channel, the meta-information on the playback control including information on scalability between streams.

9. The transmission method according to claim 1, wherein the first content data is basic layer data of (i) video and audio data indicating the content or (ii) video data, audio data, or video and audio data that constitute the content, and the second content data is extended layer data of (i) the video and audio data indicating the content or (ii) the video data, the audio data, or the video and audio data that constitute the content.

10. The transmission method according to claim 1, wherein the attribute information includes information for identifying that an asset of the first content data and an asset of the second content data are related to each other.

\* \* \* \* \*